(12) United States Patent
Hidaka et al.

(10) Patent No.: US 10,218,222 B2
(45) Date of Patent: Feb. 26, 2019

(54) NON-CONTACT CHARGING MODULE HAVING A WIRELESS CHARGING COIL AND A MAGNETIC SHEET

(71) Applicant: Panasonic Intellectual Property Management Co., Ltd., Osaka (JP)

(72) Inventors: Akio Hidaka, Oita (JP); Kenichiro Tabata, Oita (JP); Tokuji Nishino, Oita (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/900,370

(22) Filed: Feb. 20, 2018

(65) Prior Publication Data

US 2018/0175670 A1 Jun. 21, 2018

Related U.S. Application Data

(63) Continuation of application No. 13/979,244, filed as application No. PCT/JP2011/007345 on Dec. 28, 2011.

(30) Foreign Application Priority Data

Jan. 26, 2011 (JP) .................................. 2011-013619
Mar. 9, 2011 (JP) .................................. 2011-051217
Jun. 20, 2011 (JP) .................................. 2011-135946

(51) Int. Cl.
*H02J 7/00* (2006.01)
*H02J 50/10* (2016.01)
*H02J 50/90* (2016.01)
*H01F 38/14* (2006.01)
*H02J 7/02* (2016.01)
*H02J 5/00* (2016.01)

(52) U.S. Cl.
CPC .............. *H02J 50/10* (2016.02); *H01F 38/14* (2013.01); *H02J 5/005* (2013.01); *H02J 7/025* (2013.01); *H02J 50/90* (2016.02)

(58) Field of Classification Search
USPC .................................................. 320/106–115
See application file for complete search history.

(56) References Cited

U.S. PATENT DOCUMENTS 5,198,647 A 3/1993 Mizuta
5,313,444 A 5/1994 Ishii et al.
(Continued)

FOREIGN PATENT DOCUMENTS

CN 101681719 A 3/2010
CN 101771283 A 7/2010
(Continued)

OTHER PUBLICATIONS

Brooke Crothers, Getting a look inside the iPhone 4, Nanotech—The Circuits Blog—CNET News, Jun. 22, 2010, 5 pages.
(Continued)

*Primary Examiner* — Binh Tat
(74) *Attorney, Agent, or Firm* — Seed IP Law Group LLP

(57) ABSTRACT

Provided is a non-contact charging module wherein adverse effects from magnets have been prevented even where magnets are used for positioning, power transmission efficiency has been improved, and the entire module has been made thin due to a state of improved power transmission efficiency. The non-contact charging module comprises a planar coil portion (2) of spirally wound conductive wiring, and a magnetic sheet (3) that is provided so as to oppose a surface of a coil (21) on the planar coil portion (2), and is characterized in that the magnetic sheet is layered with a first layer, and a second layer that has a lower magnetic permeability and a higher saturation magnetic flux density than the first layer.

9 Claims, 14 Drawing Sheets

(56) References Cited

U.S. PATENT DOCUMENTS

| | | | |
|---|---|---|---|
| 6,175,212 B1 | 1/2001 | Oguri | |
| 6,396,241 B1 | 5/2002 | Ramos et al. | |
| 6,625,481 B2 | 9/2003 | Bennett et al. | |
| 6,803,744 B1 | 10/2004 | Sabo | |
| 7,042,196 B2 | 5/2006 | Ka-Lai et al. | |
| 7,271,596 B2 | 9/2007 | Furse et al. | |
| 7,948,208 B2 | 5/2011 | Partovi et al. | |
| 8,009,007 B2 | 8/2011 | Utsuno et al. | |
| 8,055,310 B2 | 11/2011 | Beart et al. | |
| 8,089,245 B2 | 1/2012 | Kato et al. | |
| 8,188,826 B2 | 5/2012 | Okada et al. | |
| 8,193,767 B2 | 6/2012 | Inoue et al. | |
| 8,232,764 B2 | 7/2012 | Inoue et al. | |
| 8,237,401 B2 | 8/2012 | Sip et al. | |
| 8,260,199 B2 | 9/2012 | Kowalski | |
| 8,269,375 B2 | 9/2012 | Sogabe et al. | |
| 8,280,453 B2 | 10/2012 | Beart et al. | |
| 8,283,888 B2 | 10/2012 | Inoue et al. | |
| 8,362,868 B2 | 1/2013 | Tamura et al. | |
| 8,421,574 B2 | 4/2013 | Suzuki et al. | |
| 8,457,550 B2 | 6/2013 | Goto et al. | |
| 8,541,977 B2 | 9/2013 | Hasegawa et al. | |
| 8,542,018 B2 | 9/2013 | Yoshikawa | |
| 8,547,058 B2 * | 10/2013 | Tabata | H02J 5/005 320/108 |
| 8,552,684 B2 * | 10/2013 | Tabata | H02J 7/025 320/108 |
| 8,560,024 B2 | 10/2013 | Beart et al. | |
| 8,643,219 B2 | 2/2014 | Yabe et al. | |
| 8,643,473 B2 | 2/2014 | Suzuki | |
| 8,664,801 B2 | 3/2014 | Abe | |
| 8,680,811 B2 | 3/2014 | Mochida et al. | |
| 8,766,484 B2 | 7/2014 | Baarman et al. | |
| 8,811,894 B2 | 8/2014 | Cordier | |
| 8,829,731 B2 | 9/2014 | Baarman et al. | |
| 8,847,831 B2 | 9/2014 | Kato et al. | |
| 8,905,317 B1 | 12/2014 | Hsu et al. | |
| 8,909,139 B2 | 12/2014 | Aldana et al. | |
| 8,922,162 B2 | 12/2014 | Park et al. | |
| 8,995,910 B2 | 3/2015 | Chong et al. | |
| 9,048,959 B2 | 6/2015 | Voutilainen et al. | |
| 9,126,514 B2 | 9/2015 | Soar | |
| 9,143,041 B2 | 9/2015 | Itabashi et al. | |
| 9,153,885 B2 | 10/2015 | Yamaguchi et al. | |
| 9,240,702 B2 | 1/2016 | Soar | |
| 9,265,957 B2 | 2/2016 | Chen et al. | |
| 9,362,985 B2 | 6/2016 | Uchida et al. | |
| 2005/0116683 A1 | 6/2005 | Cheng et al. | |
| 2005/0151696 A1 | 7/2005 | Govari et al. | |
| 2006/0076922 A1 | 4/2006 | Cheng et al. | |
| 2006/0082659 A1 | 4/2006 | Koo | |
| 2006/0205381 A1 | 9/2006 | Beart et al. | |
| 2007/0176829 A1 | 8/2007 | Liu | |
| 2007/0182367 A1 | 8/2007 | Partovi | |
| 2007/0206116 A1 | 9/2007 | Chou | |
| 2007/0279022 A1 | 12/2007 | Chen et al. | |
| 2007/0297204 A1 | 12/2007 | Lu et al. | |
| 2008/0031606 A1 | 2/2008 | Zax et al. | |
| 2008/0070003 A1 | 3/2008 | Nakatani et al. | |
| 2008/0111518 A1 | 5/2008 | Toya | |
| 2008/0122570 A1 | 5/2008 | Takaishi | |
| 2008/0164839 A1 | 7/2008 | Kato et al. | |
| 2008/0164840 A1 | 7/2008 | Kato et al. | |
| 2008/0164844 A1 | 7/2008 | Kato et al. | |
| 2008/0165063 A1 | 7/2008 | Schlub et al. | |
| 2008/0197960 A1 | 8/2008 | Hasegawa et al. | |
| 2008/0297107 A1 | 12/2008 | Kato et al. | |
| 2008/0297295 A1 | 12/2008 | Yamazaki et al. | |
| 2008/0303735 A1 | 12/2008 | Fujimoto et al. | |
| 2009/0001932 A1 * | 1/2009 | Kamijo | H02J 5/005 320/108 |
| 2009/0015362 A1 | 1/2009 | Okada et al. | |
| 2009/0021212 A1 | 1/2009 | Hasegawa et al. | |
| 2009/0033280 A1 | 2/2009 | Choi et al. | |
| 2009/0050624 A1 | 2/2009 | Ventura | |
| 2009/0058358 A1 | 3/2009 | Inoue et al. | |
| 2009/0096413 A1 * | 4/2009 | Partovi | H01F 5/003 320/108 |
| 2009/0102419 A1 | 4/2009 | Gwon et al. | |
| 2009/0121677 A1 | 5/2009 | Inoue et al. | |
| 2009/0143104 A1 | 6/2009 | Loh et al. | |
| 2009/0212637 A1 | 8/2009 | Baarman et al. | |
| 2009/0230777 A1 | 9/2009 | Baarman et al. | |
| 2009/0284341 A1 | 11/2009 | Okada et al. | |
| 2010/0001823 A1 | 1/2010 | Kawarai | |
| 2010/0007215 A1 | 1/2010 | Sakuma | |
| 2010/0127813 A1 | 5/2010 | Utsuno et al. | |
| 2010/0156344 A1 | 6/2010 | Inoue et al. | |
| 2010/0156345 A1 | 6/2010 | Phelps, III | |
| 2010/0156735 A1 | 6/2010 | Nakamura et al. | |
| 2010/0164431 A1 | 7/2010 | Sip et al. | |
| 2010/0181842 A1 | 7/2010 | Suzuki et al. | |
| 2010/0207575 A1 | 8/2010 | Pijnenburg et al. | |
| 2010/0210207 A1 | 8/2010 | Goto et al. | |
| 2010/0244579 A1 | 9/2010 | Sogabe et al. | |
| 2010/0244839 A1 | 9/2010 | Yoshikawa | |
| 2010/0264746 A1 | 10/2010 | Kazama et al. | |
| 2010/0270867 A1 | 10/2010 | Abe | |
| 2010/0311327 A1 | 12/2010 | Hamada | |
| 2010/0320843 A1 | 12/2010 | Kitamura et al. | |
| 2011/0025264 A1 | 2/2011 | Mochida et al. | |
| 2011/0043050 A1 | 2/2011 | Yabe et al. | |
| 2011/0050164 A1 | 3/2011 | Partovi et al. | |
| 2011/0050535 A1 | 3/2011 | Yamaguchi et al. | |
| 2011/0102125 A1 | 5/2011 | Tamura et al. | |
| 2011/0183729 A1 | 7/2011 | Satou | |
| 2011/0210619 A1 | 9/2011 | Beart et al. | |
| 2011/0210696 A1 | 9/2011 | Inoue | |
| 2011/0227799 A1 | 9/2011 | Hashimoto | |
| 2011/0241837 A1 | 10/2011 | Suzuki | |
| 2011/0267238 A1 | 11/2011 | Nekozuka | |
| 2011/0309792 A1 | 12/2011 | Mochida et al. | |
| 2011/0316475 A1 | 12/2011 | Jung et al. | |
| 2012/0057322 A1 | 3/2012 | Waffenschmidt | |
| 2012/0098352 A1 | 4/2012 | Takaishi | |
| 2012/0146580 A1 | 6/2012 | Kitamura | |
| 2012/0153731 A9 | 6/2012 | Kirby et al. | |
| 2012/0181876 A1 | 7/2012 | Baarman et al. | |
| 2012/0206307 A1 | 8/2012 | Orihara et al. | |
| 2012/0235636 A1 | 9/2012 | Partovi | |
| 2012/0289153 A1 | 11/2012 | Dobyns | |
| 2012/0309307 A1 | 12/2012 | D'Amico | |
| 2012/0319500 A1 | 12/2012 | Beart et al. | |
| 2012/0319647 A1 | 12/2012 | Itabashi et al. | |
| 2013/0005251 A1 | 1/2013 | Soar | |
| 2013/0026981 A1 | 1/2013 | Van Der Lee | |
| 2013/0033118 A1 | 2/2013 | Karalis et al. | |
| 2013/0038278 A1 | 2/2013 | Park et al. | |
| 2013/0127404 A1 | 5/2013 | Maenpaa | |
| 2013/0221910 A1 | 8/2013 | Kim et al. | |
| 2013/0229252 A1 | 9/2013 | Nogi et al. | |
| 2013/0249312 A1 | 9/2013 | Uchida et al. | |
| 2013/0249661 A1 | 9/2013 | Motomiya et al. | |
| 2013/0267170 A1 | 10/2013 | Chong et al. | |
| 2013/0293191 A1 * | 11/2013 | Hidaka | H01F 38/14 320/108 |
| 2013/0342162 A1 | 12/2013 | Tabata et al. | |
| 2014/0232335 A1 | 8/2014 | Tabata et al. | |
| 2014/0306656 A1 | 10/2014 | Tabata et al. | |
| 2014/0349573 A1 | 11/2014 | Moes et al. | |
| 2014/0375262 A1 | 12/2014 | Yamaguchi et al. | |
| 2015/0091524 A1 | 4/2015 | Park et al. | |
| 2015/0116178 A1 | 4/2015 | Kim et al. | |
| 2015/0222143 A1 | 8/2015 | Osada et al. | |

FOREIGN PATENT DOCUMENTS

| | | |
|---|---|---|
| CN | 101971452 A | 2/2011 |
| CN | 102017353 A | 4/2011 |
| CN | 102084440 A | 6/2011 |
| CN | 102208926 A | 10/2011 |
| EP | 1 928 003 A2 | 6/2008 |
| EP | 1 944 851 A2 | 7/2008 |
| EP | 2 017 860 A2 | 1/2009 |

(56) References Cited

FOREIGN PATENT DOCUMENTS

| | | |
|---|---|---|
| EP | 2 081 199 A1 | 7/2009 |
| EP | 2 172 952 A1 | 4/2010 |
| EP | 2 244 351 A2 | 10/2010 |
| EP | 2 246 864 A1 | 11/2010 |
| EP | 2 258 032 A2 | 12/2010 |
| EP | 1 928 003 B1 | 1/2011 |
| EP | 2 284 849 A1 | 2/2011 |
| EP | 2 296 228 A1 | 3/2011 |
| EP | 2 348 517 A1 | 7/2011 |
| EP | 2 367 262 A2 | 9/2011 |
| EP | 2 456 044 A1 | 5/2012 |
| EP | 2 546 844 A1 | 1/2013 |
| EP | 2 620 961 A1 | 7/2013 |
| EP | 2 712 053 A1 | 3/2014 |
| EP | 2 244 351 B1 | 9/2015 |
| JP | 56-170187 U | 12/1981 |
| JP | 05-144108 A | 6/1993 |
| JP | 07-231586 A | 8/1995 |
| JP | 07-299150 A | 11/1995 |
| JP | 11-122146 A | 4/1999 |
| JP | 11-265814 A | 9/1999 |
| JP | 2002-354713 A | 12/2002 |
| JP | 2003-045731 A | 2/2003 |
| JP | 2003-068531 A | 3/2003 |
| JP | 2003-255288 A | 9/2003 |
| JP | 2004-047701 A | 2/2004 |
| JP | 2004-110854 A | 4/2004 |
| JP | 2005-070855 A | 3/2005 |
| JP | 2005-224603 A | 8/2005 |
| JP | 2005-252612 A | 9/2005 |
| JP | 2006-032589 A | 2/2006 |
| JP | 2006-042519 A | 2/2006 |
| JP | 2006-126901 A | 5/2006 |
| JP | 2006-315368 A | 11/2006 |
| JP | 2007-214754 A | 8/2007 |
| JP | 2008-027015 A | 2/2008 |
| JP | 2008-087733 A | 4/2008 |
| JP | 2008-125115 A | 5/2008 |
| JP | 2008-135589 A | 6/2008 |
| JP | 2008-172872 A | 7/2008 |
| JP | 2008-172874 A | 7/2008 |
| JP | 2008-205214 A | 9/2008 |
| JP | 2008-205557 A | 9/2008 |
| JP | 2008-206297 A | 9/2008 |
| JP | 2008-210861 A | 9/2008 |
| JP | 2008-235860 A | 10/2008 |
| JP | 2008-289241 A | 11/2008 |
| JP | 2008-294385 A | 12/2008 |
| JP | 2008-300398 A | 12/2008 |
| JP | 2009-005475 A | 1/2009 |
| JP | 2009-027025 A | 2/2009 |
| JP | 2009-159660 A | 7/2009 |
| JP | 2009-182902 A | 8/2009 |
| JP | 2009-200174 A | 9/2009 |
| JP | 2009-247125 A | 10/2009 |
| JP | 2009-253649 A | 10/2009 |
| JP | 2009-259273 A | 11/2009 |
| JP | 2009-277820 A | 11/2009 |
| JP | 2009-284657 A | 12/2009 |
| JP | 2010-016235 A | 1/2010 |
| JP | 4400509 B2 | 1/2010 |
| JP | 2010-041906 A | 2/2010 |
| JP | 2010-050515 A | 3/2010 |
| JP | 2010-128219 A | 6/2010 |
| JP | 2010-129692 A | 6/2010 |
| JP | 2010-207017 A | 9/2010 |
| JP | 2010-213570 A | 9/2010 |
| JP | 2010-219652 A | 9/2010 |
| JP | 2010-226929 A | 10/2010 |
| JP | 2010-239781 A | 10/2010 |
| JP | 2010-239838 A | 10/2010 |
| JP | 2010-252624 A | 11/2010 |
| JP | 2010-258913 A | 11/2010 |
| JP | 2010-259172 A | 11/2010 |
| JP | 2010-283263 A | 12/2010 |
| JP | 2010-284059 A | 12/2010 |
| JP | 2011-024360 A | 2/2011 |
| JP | 2011-049936 A | 3/2011 |
| JP | 2011-072074 A | 4/2011 |
| JP | 2011-072097 A | 4/2011 |
| JP | 2011-072116 A | 4/2011 |
| JP | 4669560 B1 | 4/2011 |
| JP | 2011-101524 A | 5/2011 |
| JP | 2011-103533 A | 5/2011 |
| JP | 2011-103694 A | 5/2011 |
| JP | 2011-514796 A | 5/2011 |
| JP | 2011-155520 A | 8/2011 |
| JP | 3169797 U | 8/2011 |
| JP | 2012-010533 A | 1/2012 |
| JP | 2012-070557 A | 4/2012 |
| JP | 2012-084893 A | 4/2012 |
| JP | 2012-119662 A | 6/2012 |
| JP | 4962634 B1 | 6/2012 |
| JP | 2012-156279 A | 8/2012 |
| JP | 2012-157147 A | 8/2012 |
| JP | 5013019 B1 | 8/2012 |
| JP | 2013-021902 A | 1/2013 |
| WO | 2007/080820 A1 | 7/2007 |
| WO | 2007/122788 A1 | 11/2007 |
| WO | 2008/156025 A1 | 12/2008 |
| WO | 2009/053801 A1 | 4/2009 |
| WO | 2009/105615 A2 | 8/2009 |
| WO | 2009/114671 A1 | 9/2009 |
| WO | 2011/007661 A1 | 1/2011 |
| WO | 2011/016737 A1 | 2/2011 |
| WO | 2011/096569 A1 | 8/2011 |
| WO | 2012/073305 A1 | 6/2012 |
| WO | 2013/084480 A1 | 6/2013 |

OTHER PUBLICATIONS

English Translation of Chinese Search Report dated May 29, 2015, for corresponding CN Application No. 201280039867.7, 3 pages.
English Translation of Notification of Reasons for Refusal, dated Aug. 1, 2017, corresponding to Japanese Application No. 2016-147734, 8 pages.
Extended European Search Report, dated Oct. 8, 2014, for corresponding European Application No. 12801388.5-1556/2712053, 8 pages.
Extended European Search Report, dated Jun. 2, 2015, for corresponding EP Application No. 12846180.3-1812 / 2775632, 5 pages.
Final Office Action dated Nov. 28, 2016, for corresponding U.S. Appl. No. 14/376,574, 27 pages.
International Search Report, dated Apr. 2, 2013, for corresponding International Application No. PCT/JP2013/000553, 4 pages. (With English Translation).
International Search Report dated Apr. 3, 2012, for corresponding International Application No. PCT/JP2011/007345, 2 pages.
International Search Report, dated Dec. 4, 2012, for PCT/JP2012/006644, 4 pages. (With English Translation).
International Search Report dated Dec. 27, 2011, for corresponding International Application No. PCT/JP2011/006025, 4 pages.
International Search Report dated Sep. 4, 2012, for corresponding International Application No. PCT/JP2012/003914, 8 pages.
International Search Report dated Jun. 18, 2013, for corresponding International Application No. PCT/JP2013/003317, 2 pages.
International Search Report dated Aug. 20, 2013, for related International Application No. PCT/JP2013/003316, 4 pages.
International Search Report dated Aug. 20, 2013, for related International Application No. PCT/JP2013/003315, 6 pages.
Korean Office Action, dated Mar. 6, 2015, for corresponding KR Application No. 10-2014-709494, 12 pages. (With English Translation).
Non-Final Office Action, dated Oct. 20, 2017, for corresponding U.S. Appl. No. 15/051,408, 22 pages.
Non-Final Office Action, dated Jul. 5, 2017, for corresponding U.S. Appl. No. 15/235,885, 32 pages.
Non-Final Office Action, dated Jun. 12, 2017, for corresponding U.S. Appl. No. 13/876,509, 14 pages.

(56) References Cited

OTHER PUBLICATIONS

Notice of Reasons for Refusal, dated Oct. 25, 2016, for corresponding JP Application No. 2012-145962, 6 pages.
Notification of First Chinese Office Action, dated Mar. 30, 2015, for corresponding CN Application No. 201280053655.4, 13 pages. (With English Translation).
Notification of Reasons for Refusal, dated Apr. 12, 2016, for corresponding JP Application No. 2012-154861, 7 pages. (With English Translation).
Notification of Reasons for Refusal, dated Jun. 27, 2017, corresponding to Japanese Application No. 2016-252053, 6 pages.
Partial English Translation of Japanese Office Action dated May 10, 2011, for corresponding JP Application No. 2011/013619, 6 pages.
Partial English Translation of Japanese Office Action dated Sep. 6, 2011, for corresponding JP Application No. 2011-135946, 6 pages.
Wireless Power Consortium, "System Description Wireless Power Transfer," vol. 1: Low Power, Part 1: Interface Definition, V 1.0.1, Oct. 2010, 86 pages.
Notice of Allowance, dated Apr. 19, 2017, for corresponding U.S. Appl. No. 14/410,555, 13 pages.
Communication pursuant to Article 94(3) EPC, dated Jan. 3, 2018, for corresponding European Patent Application No. 12 801 388.5-1556, 10 pages.

* cited by examiner

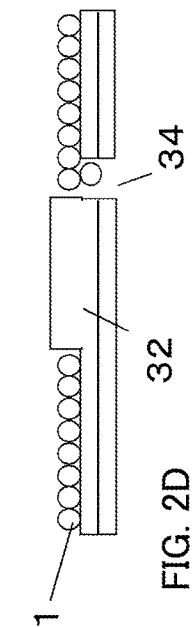
FIG. 2B
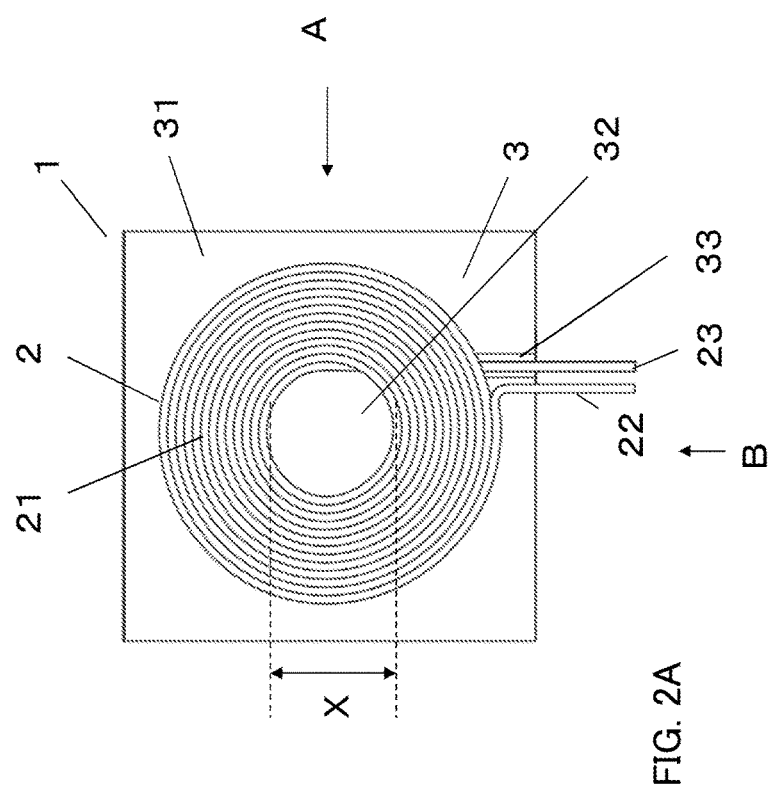
FIG. 2A
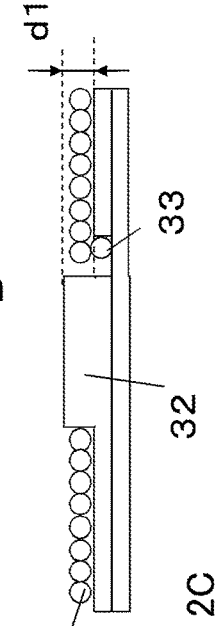
FIG. 2D
FIG. 2C

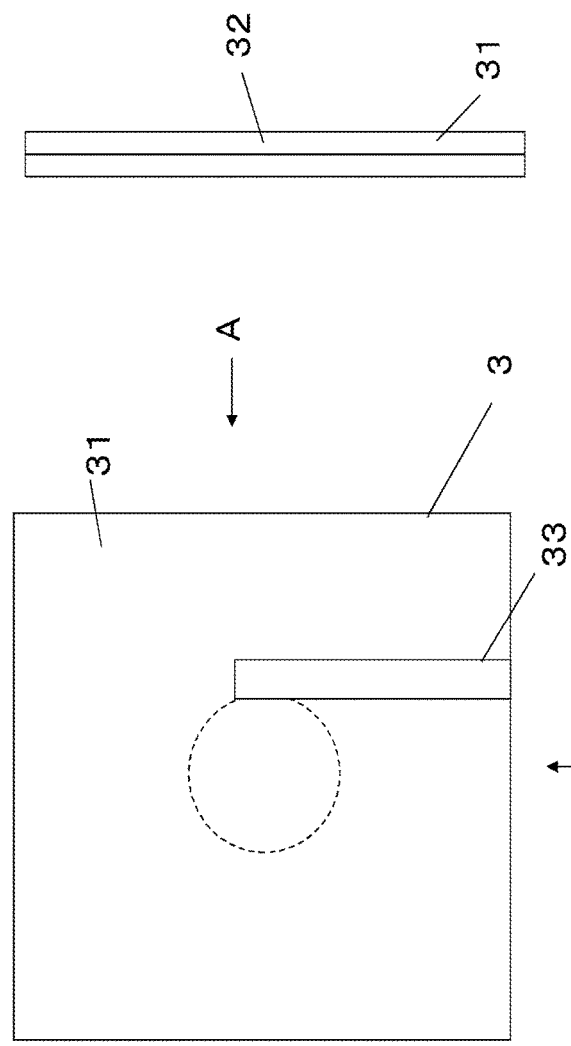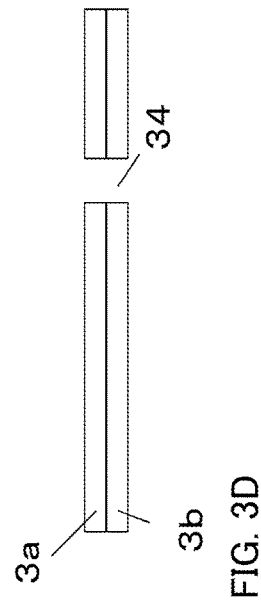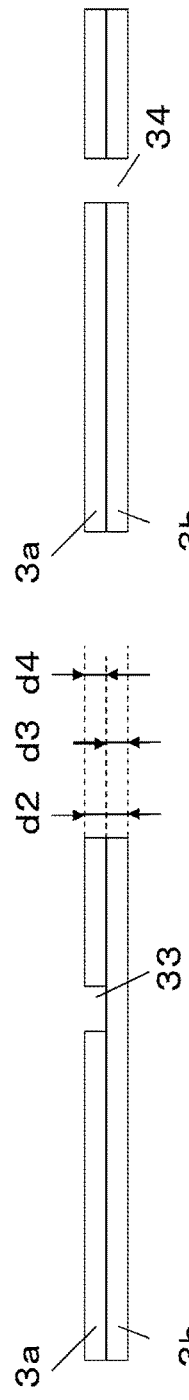
FIG. 3A  FIG. 3B  FIG. 3C  FIG. 3D

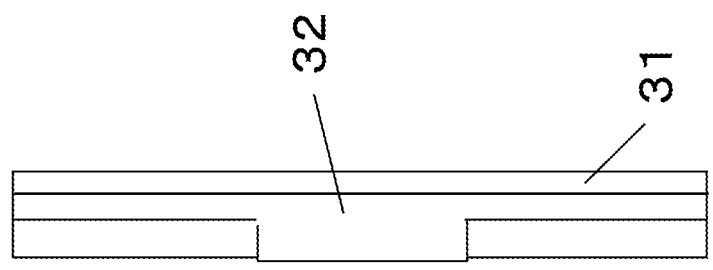
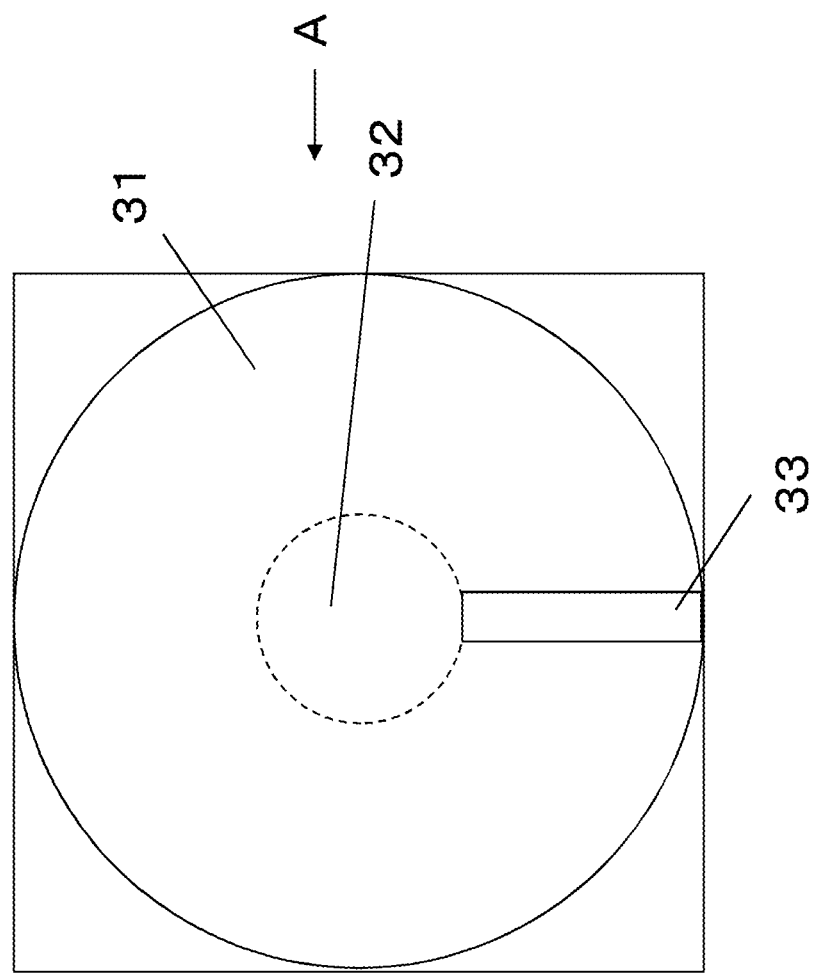

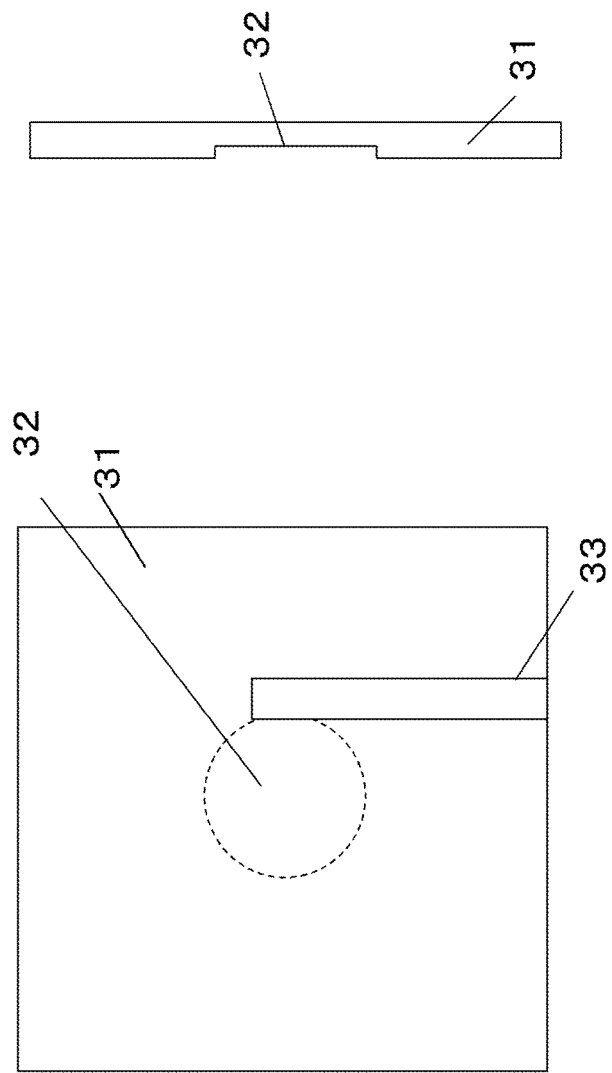
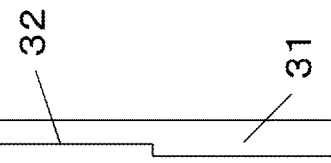
FIG. 6A
FIG. 6B
FIG. 6C
FIG. 6D

NON-CONTACT CHARGING MODULE HAVING A WIRELESS CHARGING COIL AND A MAGNETIC SHEET

BACKGROUND

Technical Field

The present invention relates to a non-contact charging module and a non-contact charger including a magnetic sheet, and a plane coil section including a wound conducting wire.

Description of the Related Art

In recent years, use of a system which enables charging of a main apparatus by a charger in a non-contact manner has become widespread. Such a system includes a power transmission coil on the charger side, and a power reception coil on the main apparatus side. Electromagnetic induction is generated between the coils, whereby electric power is transmitted from the charger side to the main apparatus side. In addition, it has been proposed to apply a portable terminal apparatus or the like as the main apparatus.

The main apparatus such as the portable terminal apparatus and the charger are preferably reduced in thickness and size. In order to meet such a demand, a configuration that includes plane coil sections as a power transmission coil and a power reception coil, and magnetic sheets may be considered, as disclosed in Patent Literature (hereinafter, abbreviated as PTL) 1 and PTL 2.

CITATION LIST

Patent Literature

PTL 1
Japanese Patent Application Laid-Open No. 2006-42519
PTL 2
Japanese Patent Application Laid-Open No. 2010-284059

BRIEF SUMMARY

Technical Problem

When using such kinds of non-contact charging modules, a magnet is sometimes utilized to align a primary-side non-contact charging module and a secondary-side non-contact charging module. However, when a non-contact charging module including a plane coil section formed of one conducting wire and an entirely planar magnetic sheet as disclosed in PTL 1 and PTL 2 is provided with a magnet for aligning the primary-side non-contact charging module and the secondary-side non-contact charging module, the non-contact charging module may be affected by the magnet. Stated differently, the magnetic sheet reduces adverse effects on the coil such as an eddy-current loss caused by metal placed under the coil, and also improves an L value of the coil. However, the magnetic permeability of the magnetic sheet is reduced by the magnet, and the action of the magnetic sheet declines. As a result, the magnetic sheet can no longer reduce adverse effects on the coil such as an eddy-current loss caused by metal and can no longer improve the L value of the coil either.

Therefore, in consideration of the above-mentioned problems, an object of the present invention is to provide a non-contact charging module and a non-contact charger each preventing an adverse effect from the magnet and improving power transmission efficiency even when using a magnet for alignment. A further object of the present invention is to provide a non-contact charging module and a non-contact charger achieving a reduction in the thickness of the entire module with improved power transmission efficiency.

Solution to Problem

In order to solve the above-mentioned problems, a non-contact charging module according to one aspect of the present invention includes: a plane coil section including a wound conducting wire; and a magnetic sheet on which a coil surface of the plane coil section is placed, and which is provided so as to face the coil surface of the plane coil section, in which the magnetic sheet includes a first layer and a second layer that has a lower magnetic permeability and a higher saturation magnetic flux density than the first layer, the first layer and the second layer being stacked in the magnetic sheet.

Advantageous Effects of Invention

According to the present invention, it is possible to provide a non-contact charging module and a non-contact charger each preventing an adverse effect from a magnet and improving power transmission efficiency even when using a magnet for alignment. Further, it is possible to provide a non-contact charging module and a non-contact charger each achieving a reduction in the thickness of the entire module with improved power transmission efficiency.

BRIEF DESCRIPTION OF THE SEVERAL VIEWS OF THE DRAWINGS

FIGS. 2A to 2D are conceptual diagrams of the non-contact charging module in the embodiment of the present invention;

FIGS. 3A to 3D are conceptual diagrams of a magnetic sheet of the non-contact charging module in the embodiment of the present invention;

FIGS. 4A and 4B are conceptual diagrams of a magnetic sheet of the non-contact charging module in the embodiment of the present invention;

FIGS. 6A to 6D are conceptual diagrams of a magnetic sheet of the non-contact charging module in the embodiment of the present invention;

DETAILED DESCRIPTION

Figure 1:
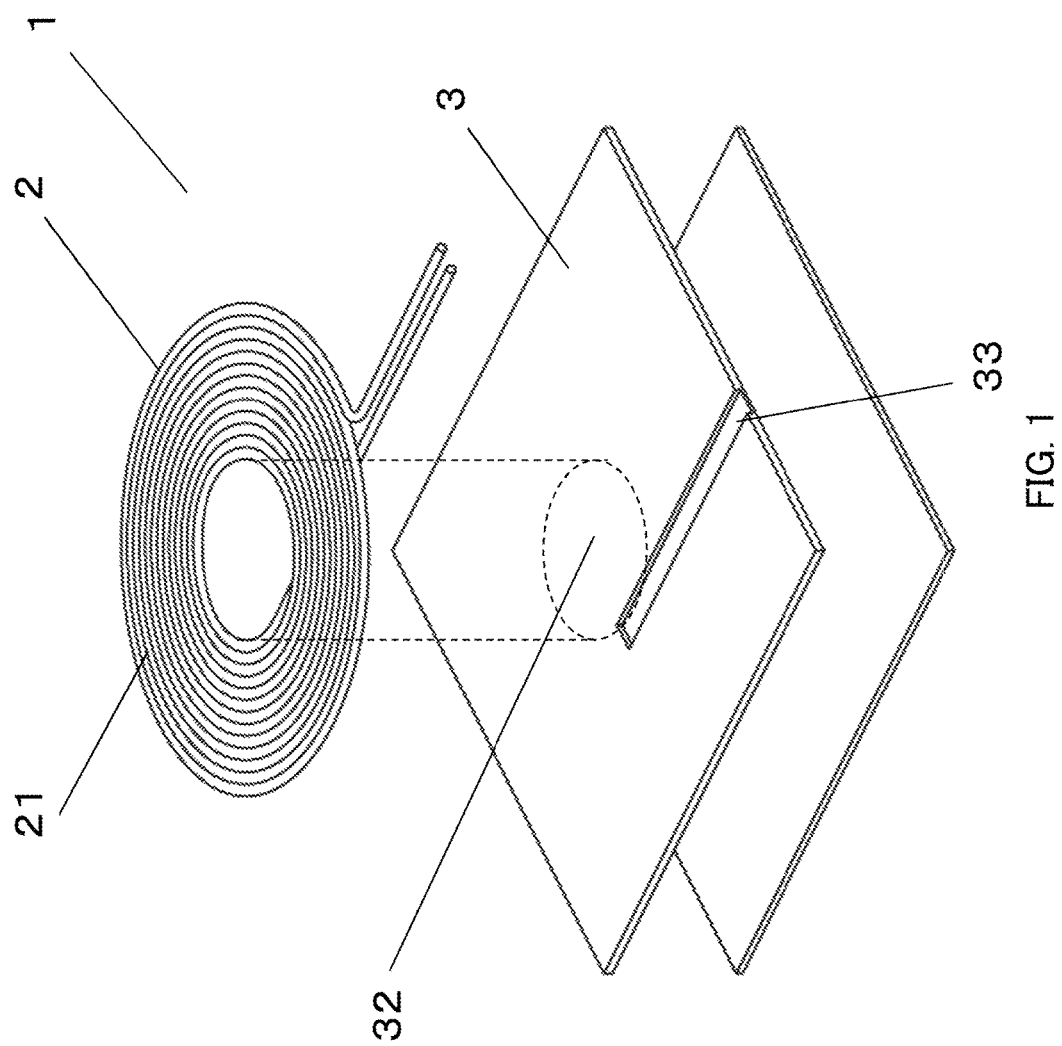
FIG. 1 is an assembly diagram of a non-contact charging module in an embodiment of the present invention.

The invention as recited in claim 1 includes: a plane coil section including a wound conducting wire; and a magnetic sheet on which a coil surface of the plane coil section is placed, and which is provided so as to face the coil surface of the plane coil section, in which the magnetic sheet includes a first layer and a second layer that has a lower magnetic permeability and a higher saturation magnetic flux density than the first layer, the first layer and the second layer being stacked in the magnetic sheet. Thus, it is possible to provide a non-contact charging module and a non-contact charger each preventing an adverse effect from the magnet and improving power transmission efficiency even when using a magnet for alignment. Further, it is possible to provide a non-contact charging module and a non-contact charger each achieving a reduction in the thickness of the entire module with improved power transmission efficiency.

According to the invention as recited in claim 2, when aligning with a counterpart-side non-contact charging module, there are situations where a magnet provided in the counterpart-side non-contact charging module is utilized and there are situations where a magnet is not utilized. Therefore, a non-contact charging module that corresponds to two alignment methods can be obtained.

The invention as recited in claim 3 is the non-contact charging module according to claim 1, in which the first layer is formed by a first ferrite sheet, and the second layer is formed by a second ferrite sheet. Thus, even though the thickness is reduced, it is possible to obtain a high saturation magnetic flux density and a high magnetic permeability with favorable balance with respect to a non-contact charging module.

According to the invention as recited in claim 4, a thickness of the second ferrite sheet is approximately three times a thickness of the first ferrite sheet in a stacking direction of the magnetic sheet. Thus, the L value of the coil can be improved and a reduction in the thickness can be achieved.

According to the invention as recited in claim 5, a thickness of the magnetic sheet is approximately 600 μm. Therefore, the L value of the coil can be improved and a reduction in the thickness can be achieved.

According to the invention as recited in claim 6, the first layer is made from an amorphous magnetic sheet. Therefore, the first layer can be further reduced in thickness.

The invention as recited in claim 7 is the non-contact charging module according to claim 1, in which the second layer is an Mn—Zn ferrite sheet having a magnetic permeability equal to or higher than 250 and a saturation magnetic flux density equal to or higher than 350 mT. Therefore, it is difficult for the non-contact charging module to be adversely effected by a magnet, and the non-contact charging module can be reduced in thickness.

According to the invention as recited in claim 8, the second layer faces the plane coil section. Therefore, a current loss can be suppressed and an alternating-current resistance can be reduced.

The invention as recited in claim 9 is a non-contact charger including a plane coil section included in the non-contact charging module according to claim 1, in which the plane coil section is used as at least one of a power transmission coil and a power reception coil. Therefore, a non-contact charger can be provided that, even when using a magnet for alignment, prevents an adverse effect from the magnet and improves the power transmission efficiency. Further, a non-contact charger can be provided in which thinness of the entire module is achieved with improved power transmission efficiency.

(Embodiment)

An embodiment of the present invention is explained below with reference to the accompanying drawings. FIG. 1 is an assembly diagram of a non-contact charging module in the embodiment of the present invention. FIGS. 2A to 2D are conceptual diagrams of the non-contact charging module in the embodiment of the present invention. FIG. 2A is a top view of the non-contact charging module, FIG. 2B is a sectional view of the same viewed from an A direction in FIG. 2A, and FIGS. 2C and 2D are sectional views of the non-contact charging module viewed from a B direction in FIG. 2A. FIGS. 3A to 3D are conceptual diagrams of a magnetic sheet of the non-contact charging module in the embodiment of the present invention. FIG. 3A is a top view of the magnetic sheet, FIG. 3B is a sectional view of the magnetic sheet viewed from an A direction in FIG. 3A, and FIGS. 3C and 3D are sectional views of the magnetic sheet viewed from a B direction in FIG. 3A. FIGS. 4A and 4B are conceptual diagrams of the magnetic sheet of the non-contact charging module according to the embodiment of the present invention. FIG. 4A is a top view, and FIG. 4B is a sectional view as seen from direction A in FIG. 4A.

Non-contact charging module 1 according to the present invention includes plane coil section 2 including a spirally wound conducting wire and magnetic sheet 3 provided so as to face the surface of coil 21 of plane coil section 2.

As shown in FIGS. 1 and 2, plane coil section 2 includes coil 21 including a conducting wire wound toward the radial direction so as to draw a swirl on a surface and terminals 22 and 23 provided at both ends of coil 21. Coil 21 includes a conducting wire wound in parallel on a plane. A surface formed by coil 21 is referred to as coil surface. A thickness direction is the direction in which plane coil section 2 and magnetic sheet 3 are stacked. In this embodiment, coil 21 is wound outward from a bore having a diameter of 20 mm. The outer diameter of coil 21 is 30 mm. That is, coil 21 is wound in a doughnut shape. Coil 21 may be wound in a circular shape or may be wound in a polygonal shape such as a square or a rectangle. Coil 21 may also be any other shape. In the case of the polygonal shape, a corner portion of coil 21 may be rounded.

Winding the conducting wires to leave a space in between decreases the floating capacity between the conducting wire of an upper stage and the conducting wire of a lower stage, thereby making it possible to minimize the alternating-current resistance of coil 21. In addition, the thickness of coil 21 can be minimized by winding the conducting wires densely.

As shown in FIGS. 2A to 2D, in this embodiment, the conducting wire has a circular shape in cross-section, but an conducting wire having a square shape in cross-section may be employed. However, compared with the conducting wire having a square shape in cross-section, when the conducting wire having a circular shape in cross-section is used, a gap is formed between adjacent conducting wires. Therefore, stray capacitance between the conducting wires decreases, which in turn makes it possible to reduce the alternating-current resistance of coil 21.

In addition, the alternating-current resistance of coil 21 is lower and transmission efficiency can be increased when coil 21 is wound in one stage rather than being wound in two stages in the thickness direction. This is because, when the conducting wire is wound in two stages, stray capacitance is generated between the conducting wire in the upper stage and the conducting wire in the lower stage. Therefore, it is preferable to wind coil 21 in one stage in as many portions as possible rather than being entirely wound in two stages. Winding coil 21 in one stage makes it possible to reduce the thickness of non-contact charging module 1. It should be noted that, the low alternating-current resistance of coil 21 in this case prevents a loss in coil 21. Improving an L value makes it possible to improve power transmission efficiency of non-contact charging module 1, which is dependent on the L value. However, the coil may be stacked in a plurality of stages, and a large L value can be secured while decreasing the size thereof.

In this embodiment, inner diameter x on the inner side of coil 21 shown in FIGS. 2A to 2D is 10 mm to 20 mm. The outer diameter of coil 21 is about 30 mm. The smaller the inner diameter x, the larger the number of turns of coil 21 can be formed in non-contact charging module 1 of the same size, which in turn makes it possible to improve the L value.

Terminals 22 and 23 may be arranged close to each other as shown in FIG. 2A, or may be arranged apart from each other. However, when terminals 22 and 23 are arranged apart from each other, non-contact charging module 1 is more easily mounted.

Magnetic sheet 3 is provided to improve power transmission efficiency of non-contact charging using an electromagnetic induction action. As shown in FIGS. 2A to 2D, magnetic sheet 3 includes flat portion 31, center portion 32, which is the center of magnetic sheet 3 and equivalent to the inner diameter (hollow portion) of coil 21, and linear recessed portion 33. As shown in FIGS. 2A to 2D, center portion 32 does not always need to be formed in a protruding shape, and may have the same thickness (flat) as flat portion 31, may be thinner (recessed portion) than the flat portion, or may be a through-hole. Linear recessed portion 33 may be slit 34. Linear recessed portion 33 or slit 34 is not always necessary. However, as shown in FIGS. 2C and 2D, when linear recessed portion 33 or slit 34 is provided, the conducting wire from a winding end of coil 21 to terminal 23 can be housed in linear recessed portion 33 or slit 34. Therefore, a reduction in size in the thickness direction is made possible. Specifically, linear recessed portion 33 or slit 34 is formed so as to be substantially perpendicular to the end of magnetic sheet 3, and when coil 21 is circular, linear recessed portion 33 or slit 34 is formed so as to overlap with a tangential line of the outer circumference of center portion 32. Linear recessed portion 33 or slit 34 formed in this manner makes it possible to form terminals 22 and 23 without bending the conducting wire. Note that, in this case, the length of linear recessed portion 33 or slit 34 is about 15 mm to 20 mm. Meanwhile, the length of linear recessed portion 33 or slit 34 depends on the inner diameter of coil 21.

Linear recessed portion 33 or slit 34 may be formed in a portion where the end of magnetic sheet 3 and the outer circumference of center portion 32 are closest to each other. Consequently, it is possible to minimize the area where linear recessed portion 33 or slit 34 is formed and to improve the transmission efficiency of non-contact charging module 1. Note that, in this case, the length of linear recessed portion 33 or slit 34 is about 5 mm to 10 mm. In both of the placements, the inner side end of linear recessed portion 33 or slit 34 is connected to center portion 32. Linear recessed portion 33 or slit 34 may be placed in a different way. Stated differently, it is preferable to place coil 21 in a one-stage structure. In this case, it is possible to form all turns in the radial direction of coil 21 in the one-stage structure or to form a part of the turns in the one-stage structure while forming the other parts in a two-stage structure. Therefore, one of terminals 22 and 23 can be drawn out from the outer circumference of coil 21. However, the other has to be drawn out from the inner side. Therefore, a wound portion of coil 21 and a portion from a winding start point (winding end point) of coil 21 to terminal 22 or 23 always overlap in the thickness direction. Accordingly, linear recessed portion 33 or slit 34 may be provided in the overlapping portion. In the case of linear recessed portion 33, since no through-hole or slit is provided in magnetic sheet 3, it is possible to prevent a magnetic flux from leaking and improve the power transmission efficiency of non-contact charging module 1. On the other hand, in the case of slit 34, it is easy to form magnetic sheet 3. In the case of linear recessed portion 33, the cross-sectional shape of linear recessed portion 33 is not limited to a square shape as shown in FIGS. 4A and 4B and may be an arc shape or rounded shape.

In this embodiment, as magnetic sheet 3, a Ni—Zn ferrite sheet, a Mn—Zn ferrite sheet, a Mg—Zn ferrite sheet, or the like can be used. The ferrite sheet can reduce the alternating-current resistance of coil 21 compared with an amorphous metal magnetic sheet.

As shown in FIGS. 3A to 3D, at least high-saturation magnetic flux density material 3a and high-magnetic permeability material 3b are stacked in magnetic sheet 3. Even when high-saturation magnetic flux density material 3a and high-magnetic permeability material 3b are not stacked, it is advisable to use high-saturation magnetic flux density material 3a having saturation magnetic flux density equal to or higher than 350 mT and thickness of at least 300 μm.

Although any one of high-saturation magnetic flux density material 3a and high-magnetic permeability material 3b can be placed on the side nearer to plane coil section 2, as shown in FIGS. 3C and 3D and the like, it is better to place high-saturation magnetic flux density material 3a nearer to plane coil section 2. This configuration can lower the alternating-current resistance of plane coil section 2. As a result, the power transmission efficiency of non-contact charging module 1 can be improved.

In the present embodiment, magnetic sheet 3 has a size of approximately 33 mm×33 mm. Thickness d1 of a protruding portion of center portion 32 shown in FIG. 2C is 0.2 mm. In FIG. 3C, reference sign d2 denotes the thickness of magnetic sheet 3, and the respective thicknesses of magnetic sheet 3, high-saturation magnetic flux density material 3a, and high-magnetic permeability material 3b are set such that thickness d2 of magnetic sheet 3 is 0.6 mm, thickness d3 of high-magnetic permeability material 3b is 0.15 mm, and thickness d4 of high-saturation magnetic flux density material 3a is 0.45 mm. Note that it is advisable to make the diameter of linear recessed portion 33 approximately the same as the diameter of the conducting wire constituting coil 21 to ensure that linear recessed portion 33 is formed only with the minimum depth. The reason behind this is that the portion of magnetic sheet 3 corresponding to linear recessed portion 33 becomes thinner as linear recessed portion 33 increases in depth, which in turn reduces the transmission efficiency of non-contact charging module 1, unfavorably.

Next, the reason why magnetic sheet 3 is formed in a multi-layered structure will be explained.

In general, there are cases where non-contact charging module 1 utilizes a magnet for aligning a primary-side non-contact charging module (transmission-side non-contact charging module) and a secondary-side non-contact charging module (reception-side non-contact charging module), and where non-contact charging module 1 utilizes no magnet for such aligning. In both cases, non-contact charging module 1 is required to operate stably. Note that a magnet is normally mounted on the primary-side non-contact charging module, and alignment is made possible mainly by the attraction exerted by the magnet on magnetic sheet 3 of the secondary-side non-contact charging module.

At this time, due to the effects of the magnet, the L value of coil 21 of non-contact charging module 1 varies significantly between a case where the magnet is used for alignment and a case where a magnet is not used. This is because the presence of a magnet prevents the magnetic flux flowing between the primary-side and secondary-side non-contact charging modules. Accordingly, when a magnet is present, the L value of coil 21 of non-contact charging module 1 significantly decreases. Magnetic sheet 3 includes high-saturation magnetic flux density material 3a to reduce the effects of the magnet. A magnetic flux is not liable to become saturated in high-saturation magnetic flux density material 3a even when the magnetic field is strong. Thus, high-saturation magnetic flux density material 3a is not easily affected by a magnet, and thus the L value of coil 21 in a case where a magnet is used can be improved.

However, since high-saturation magnetic flux density material 3a generally cannot obtain a high magnetic permeability, the L value of coil 21 decreases compared to high-magnetic permeability material 3b when no magnet for alignment is used. Therefore, high-magnetic permeability material 3b is stacked on high-saturation magnetic flux density material 3a to constitute magnetic sheet 3. That is, since high-magnetic permeability material 3b can strengthen the magnetic field, high-magnetic permeability material 3b can improve the L value of coil 21. Thus, even when there is no magnet, the L value of coil 21 can be improved by high-magnetic permeability material 3b.

High-saturation magnetic flux density material 3a is, for example, a ferrite sheet having a magnetic permeability equal to or higher than 250 and a saturation magnetic flux density that is generally equal to or less than approximately 340 mT to 450 mT. The thickness of high-saturation magnetic flux density material 3a is between 400 μm and 500 μm, and is approximately 450 μm in the present embodiment. According to the present embodiment, for example, a Mn—Zn material is suitable, and a material that achieves a high magnetic permeability even when the sheet is thin is preferable. As described above, if the magnetic sheet described hereunder is used, an adequate effect can be obtained even if high-magnetic permeability material 3b is not stacked thereon.

High-magnetic permeability material 3b is a ferrite sheet having a magnetic permeability equal to or higher than 3000 and a saturation magnetic flux density of approximately 300 mT (250 mT to 320 mT). The thickness of high-magnetic permeability material 3b is between 100 μm and 200 μm, and is approximately 150 μm in the present embodiment. If the thickness is between around 100 μm and 200 μm, the L value of coil 21 can be improved. According to the present embodiment, for example, a Mn—Zn material is suitable, and a material is preferable which does not cause the L value of coil 21 to significantly change, as magnetic sheet 3 even when a magnet is present close to the non-contact charging module. The above-described effect can be efficiently obtained by setting the saturation magnetic flux density of high-magnetic permeability material 3b to be lower than that of high-saturation magnetic flux density material 3a, and setting the magnetic permeability thereof to be higher than that of high-saturation magnetic flux density material 3a. Thus, regardless of the thickness of magnetic sheet 3, it is favorable to make the relationship between the thicknesses of high-saturation magnetic flux density material 3a and high-magnetic permeability material 3b such that the ratio of the thickness of high-saturation magnetic flux density material 3a to the thickness of high-magnetic permeability material 3b is around 3:1. It is thereby possible to achieve a balance between a case where a magnet is provided and a case where no magnet is provided, while achieving a reduction in thickness, and obtain an efficient non-contact charging module.

Thus, using ferrite (sintered body) to make high-saturation magnetic flux density material 3a and high-magnetic permeability material 3b allows a non-contact charging module to have a well-balanced combination of a high saturation magnetic flux density and a high magnetic permeability even when the thickness of the non-contact charging module is reduced.

Making the thickness of high-saturation magnetic flux density material 3a approximately three times the thickness of high-magnetic permeability material 3b in the stacking direction of magnetic sheet 3 in the manner described above can improve the L value of coil 21 and achieve a reduction in thickness. That is, it is desirable to stack the aforementioned materials according to the thickness ratio described above in order to obtain the effects of high-saturation magnetic flux density material 3a and high-magnetic permeability material 3b with a limited thinness. In addition, since the thickness of magnetic sheet 3 is approximately 600 μm, the L value of coil 21 can be improved and a further reduction in thickness can be achieved.

Note that if a reduction in the thickness and size of non-contact charging module 1 is not taken into consideration, the thickness of high-saturation magnetic flux density material 3a may be equal to or higher than 500 μm and the thickness of high-magnetic permeability material 3b may be equal to or higher than 200 μm. Meanwhile, making the thickness of high-saturation magnetic flux density material 3a approximately 450 μm and the thickness of high-magnetic permeability material 3b approximately 150 μm makes it possible to obtain the effects of high-saturation magnetic flux density material 3a and high-magnetic permeability material 3b while achieving a reduction in thickness.

Note that, in magnetic sheet 3, high-saturation magnetic flux density material 3a and high-magnetic permeability material 3b may be stacked using an adhesive sheet after baking high-saturation magnetic flux density material 3a and high-magnetic permeability material 3b, or may be baked and stacked after stacking the respective molding bodies of high-saturation magnetic flux density material 3a and high-magnetic permeability material 3b.

High-magnetic permeability material 3b need not be stacked over the entire surface of high-saturation magnetic flux density material 3a. That is, high-magnetic permeability material 3b may be formed only at a portion facing coil 21, or may be formed at a portion corresponding to the inside of an inner circumferential circle of coil 21.

In addition, high-magnetic permeability material 3b may be an amorphous magnetic sheet. In this case, the thickness of high-magnetic permeability material 3b can be made between 80 μm to 100 μm, and high-magnetic permeability material 3b can be reduced in thickness compared to a case where ceramics are used. However, use of an amorphous magnetic sheet causes an eddy-current loss and also causes the alternating-current resistance of coil 21 to rise. In contrast, use of a ceramic magnetic sheet can avoid a rise in the alternating-current resistance and increase the charging efficiency.

Figure 5:
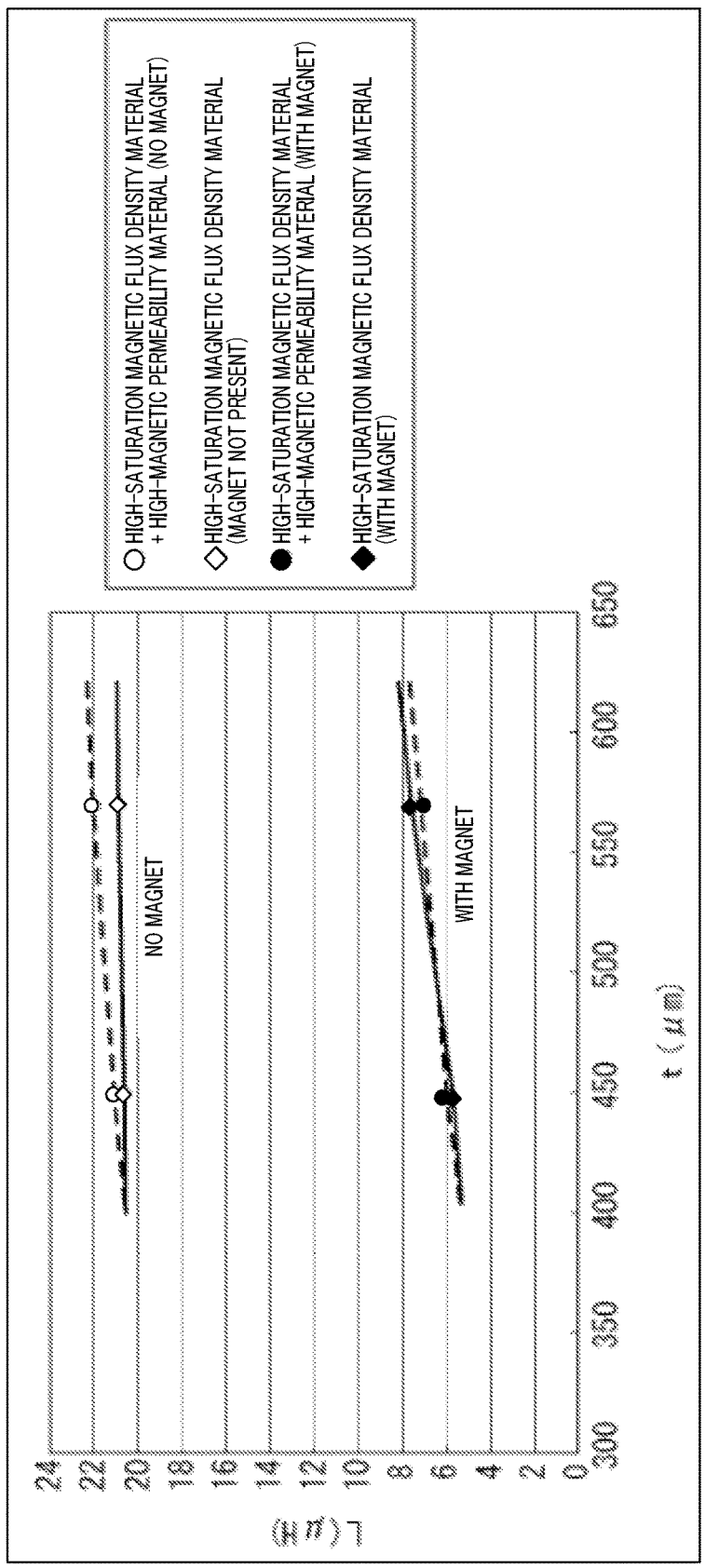
FIG. 5 illustrates L values of a coil in accordance with the presence/absence of a magnet and the presence/absence of stacking in the embodiment of the present invention.

FIG. 5 illustrates L values of a coil in accordance with the presence/absence of a magnet and the presence/absence of stacking in the embodiment of the present invention. Note that, in FIG. 5, magnetic sheet 3 having a thickness of 600 μm formed by stacking high-saturation magnetic flux density material 3a and high-magnetic permeability material 3b is compared with magnetic sheet 3 having a thickness of 600 μm formed by only high-saturation magnetic flux density material 3a. As shown in FIG. 5, when magnet 30 is used for alignment, there is no change in the L value between the two magnetic sheets. However, when magnet 30 is not used for alignment, the L value of magnetic sheet 3 formed by stacking high-saturation magnetic flux density material 3a and high-magnetic permeability material 3b is larger. Note that, the L value between 15 and 35 μH is required for non-contact charging module 1 in general. That is, if the L value is equal to or higher than 35 μH, the magnetic field becomes too strong, which leads to an increase in alternating-current resistance and the amount of heat generated in coil 21. If the L value is equal to or less than 15 μH, the magnetic field becomes so weak that power transmission becomes impossible. However, the L value decreases to a large degree when magnet 30 is used for alignment, so that an L value between 8 and 35 μH is required in this case.

Next, the thickness of the center portion of magnetic sheet 3 will be described. FIGS. 6A to 6D are conceptual diagrams of the magnetic sheet of the non-contact charging module in the embodiment of the present invention, in which center portion 32 is formed in the shape of a recessed portion or as a through-hole. Forming center portion 32 in a protruding shape as in FIGS. 2A to 2D can improve the magnetic flux density of coil 21 and also enhance the transmission efficiency of non-contact charging module 1.

However, forming center portion 32 in the shape of a recessed portion or providing a hole portion to serve as a through-hole therein can reduce the effects of a magnet. The reason is described below.

As described above, with respect to non-contact charging module 1, there are cases where a magnet is utilized to align a primary-side non-contact charging module and a secondary-side non-contact charging module, and cases where a magnet is not utilized for such alignment. Further, since the presence of a magnet prevents the magnetic flux flowing between the primary-side and secondary-side non-contact charging modules, the L value of coil 21 of non-contact charging module 1 significantly decreases when there is a magnet in the non-contact charging module on the counterpart side. Further, coil 21 forms an LC resonance circuit using a not-shown capacitor in non-contact charging module 1. At this time, if the L value varies significantly between a case where a magnet is used for alignment and a case where a magnet is not used for alignment, the resonance frequency with the capacitor will also vary significantly. Since the resonance frequency is used for power transmission between the primary-side non-contact charging module and the secondary-side non-contact charging module, it will not be possible to perform correct power transmission if the resonance frequency varies significantly depending on the presence or absence of a magnet.

Therefore, in order to set the resonance frequency of a case where a magnet is used for alignment to have a value close to a value of the resonance frequency of a case where a magnet is not used for alignment, it is necessary to set the L value of coil 21 of a case where a magnet is used for alignment to be similar to the L value of a case where a magnet is not used for alignment.

Figure 7:
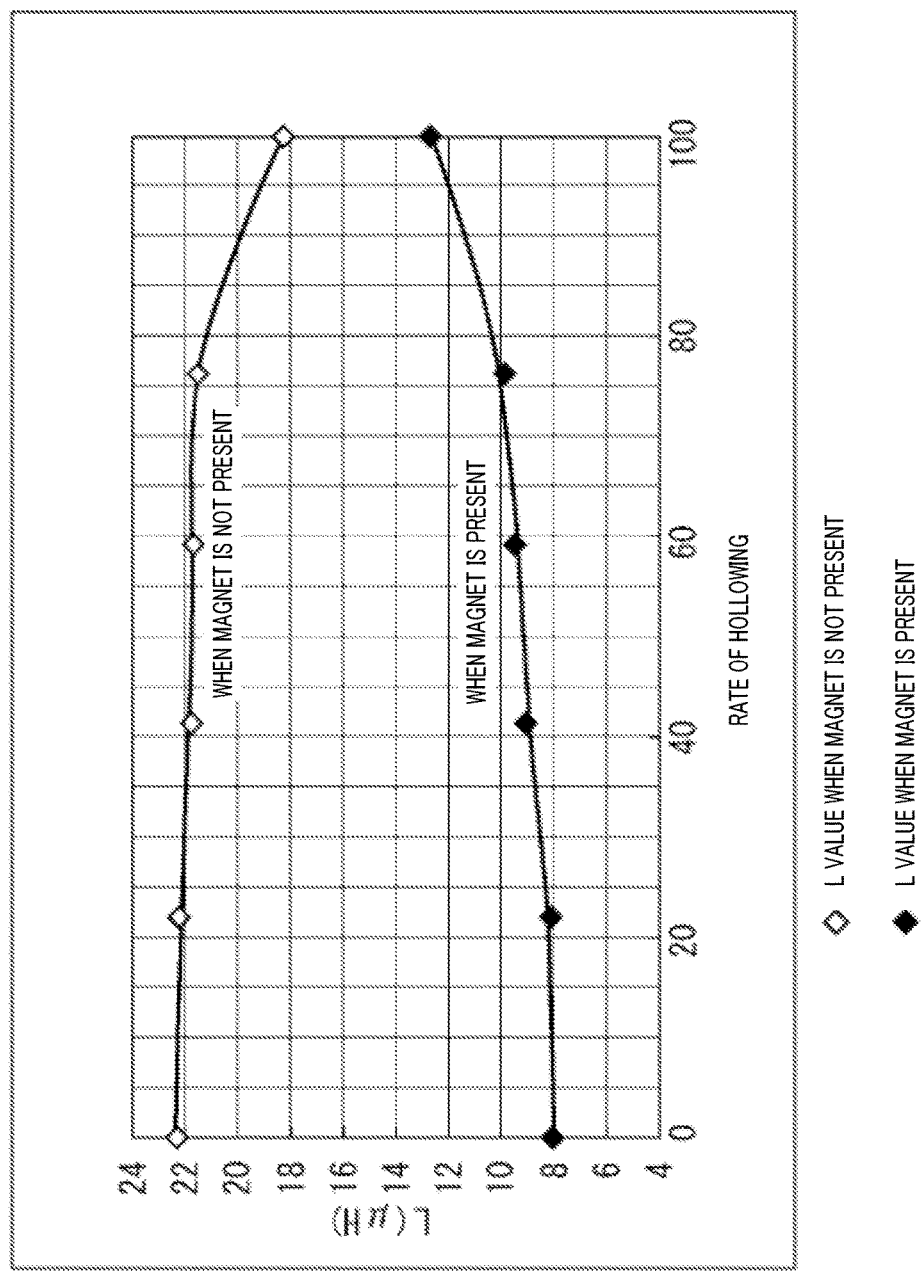
FIG. 7 illustrates the relationship between the L value of the coil and the thickness of a center portion when a magnet is utilized for alignment and when a magnet is not utilized for alignment in the non-contact charging module of the present embodiment.

FIG. 7 illustrates the relationship between the L value of the coil and the thickness of the center portion in a case where a magnet is utilized for alignment and a case where a magnet is not utilized for alignment in the non-contact charging module of the present embodiment. Note that, as to the degree of hollowing, 0% indicates that center portion 32 is not configured in a recessed shape and is flat, while 100% indicates that center portion 32 is configured as a through-hole. As shown in FIG. 7, when a magnet is not utilized, as center portion 32 of magnetic sheet 3 is reduced in thickness, the magnetic field of coil 21 becomes smaller and the L value of coil 21 decreases. In contrast, when a magnet is utilized, as center portion 32 of magnetic sheet 3 is reduced in thickness, the distance in the stacking direction between magnetic sheet 3 and the magnet increases. Thus, the effects of the magnet become smaller, and the magnetic field of coil 21 increases, and the L value of coil 21 rises in this case. The L values are closest to each other when center portion 32 is formed as a through-hole. That is, forming center portion 32 as a through-hole can minimize the effects of a magnet that is utilized for alignment.

Further, since alignment is performed through the magnet and magnetic sheet 3 attracting each other, alignment precision is improved when there is a certain degree of thickness at the center portion. In particular, the alignment precision decreases if the degree of hollowing is equal to or higher than 60%. Accordingly, by making the degree of hollowing equal to a value between 40 and 60%, the L values of coil 21 of a case where a magnet is utilized for alignment and of a case where a magnet is not utilized for alignment can be made values close to each other, and at the same time, an alignment effect of the magnet can also be sufficiently obtained. That is, the magnet and center portion 32 of magnetic sheet 3 can attract each other, and the respective centers thereof can be aligned with each other. Note that, in the present embodiment, the degree of hollowing is set to approximately 50%, and both effects can be obtained most efficiently. Further, in order to leave about half of the entire thickness, after the through-hole is formed, the through-hole may be filled with a magnetic material to a level that is half of the depth of the through-hole.

Further, since magnetic sheet 3 may be formed by stacking high-saturation magnetic flux density material 3a and high-magnetic permeability material 3b, for example, a configuration may be adopted in which center portion 32 of one of high-saturation magnetic flux density material 3a and high-magnetic permeability material 3b is formed in a flat shape and a through-hole is formed in center portion 32 of the other one to thereby form center portion 32 of magnetic sheet 3 in a recessed shape. Further, it is advisable to make the diameter of the recessed portion or the through-hole smaller than the inner diameter of the coil. The magnetic field inside the inner circumferential circle of the coil can be increased by making the diameter (size) of the recessed portion or the through-hole substantially the same (0 to 2 mm smaller than the inner diameter of the coil) as the inner diameter (size of hollow portion) of the coil.

Furthermore, by making the diameter (size) of the recessed portion or the through-hole smaller than the inner diameter (size of hollow portion) of the coil (2 to 8 mm smaller than the inner diameter of the coil) to form a stepped shape, the outer side of the stepped shape can be utilized for alignment, and the inner side can be utilized to set the L values of coil 21 in a case where a magnet is utilized for alignment and a case where a magnet is not utilized to be values close to each other. It is favorable to make the size of the recessed portion or the through-hole greater than the size of magnet.

By making the shape of the top surface of the recessed portion or the through-hole identical to the shape of the inner circle (hollow portion) of coil 21, the magnet and center portion 32 of magnetic sheet 3 can attract each other in a well-balanced manner and the centers thereof can be precisely aligned.

Further, because the entire edge of the recessed portion or through-hole is equidistant from the inner diameter (hollow portion) of coil 21, the magnet and center portion 32 of magnetic sheet 3 can attract each other in a well-balanced manner and the centers thereof can be aligned with even better precision.

Figure 8B:
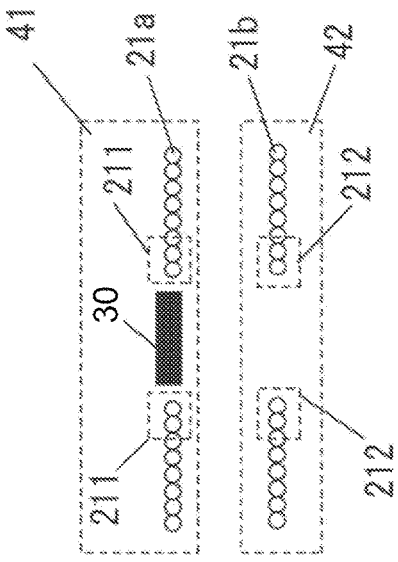
FIGS. 8A to 8D are sectional views of a coil and a magnet of the non-contact charging module in the embodiment of the present invention.
Figure 8D:
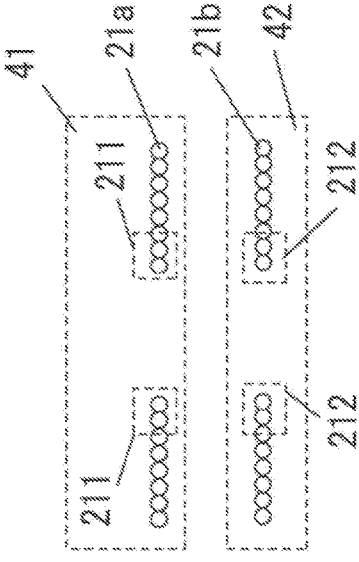
Figure 8A:
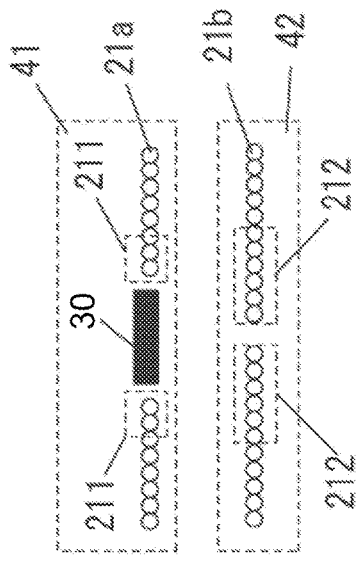
Figure 8C:
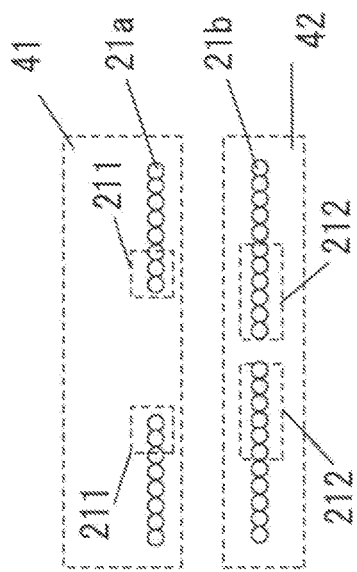
Figure 9:
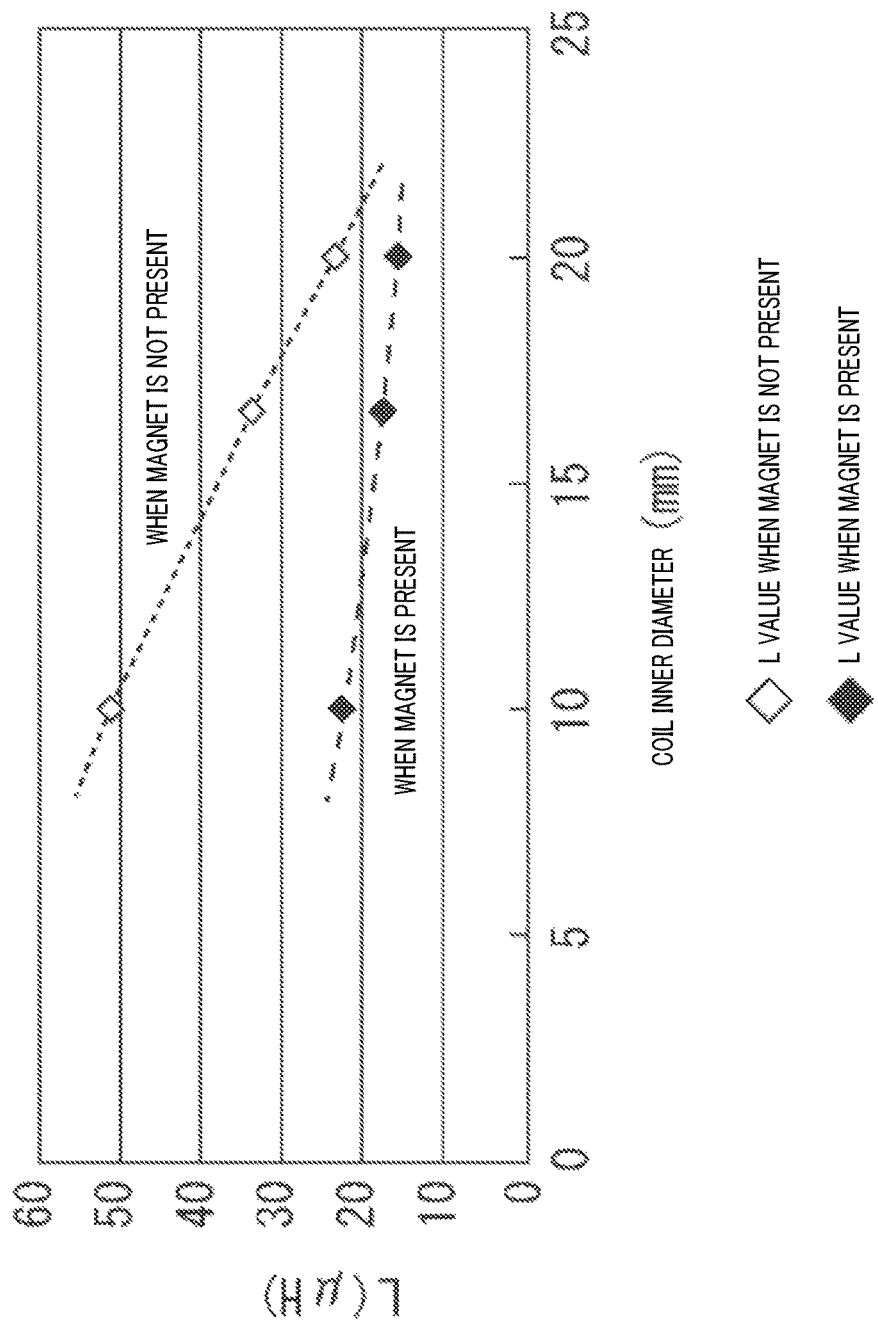
FIG. 9 illustrates the relationship between the inner diameter of the coil and the L value of the coil.

Next, the relationship between the size of the magnet and the size of the inner diameter of coil 21 will be described. FIGS. 8A to 8D are sectional views of a coil and a magnet of the non-contact charging module according to the embodiment of the present invention. FIG. 8A illustrates a case where a magnet is used for alignment when the inner width of a coil is small. FIG. 8B illustrates a case where a magnet is used for alignment when the inner width of a coil is large. FIG. 8C illustrates a case where a magnet is not used for alignment when the inner width of a coil is small. FIG. 8D illustrates a case where a magnet is not used for alignment when the inner width of a coil is large. Note that FIGS. 8A to 8D are used to describe secondary-side coil 21*b* of secondary-side non-contact charging module 42 that carries out power transmission with primary-side non-contact charging module 41 equipped with magnet 30. However, the description regarding secondary-side coil 21*b* related to secondary-side non-contact charging module 42 to be described hereunder also applies to primary-side coil 21*a* of primary-side non-contact charging module 41 that performs power transmission with secondary-side non-contact charging module 42 that is equipped with magnet 30. That is, a plane coil section of a non-contact charging module is described that enables alignment and power transmission in both of a case where the other non-contact charging module that is the counterpart for power transmission is equipped with a magnet and a case where the other non-contact charging module is not equipped with a magnet. FIG. 9 illustrates the relationship between the inner diameter of a coil and the L value of a coil.

Primary-side coil 21*a* and secondary-side coil 21*b* face each other. Among the respective areas of coils 21*a* and 21*b*, a magnetic field is generated at inside portions 211 and 212, and power transmission is performed. Inside portions 211 and inside portions 212 face each other, respectively. Inside portions 211 and 212 are also portions that are close to magnet 30, and are liable to be adversely affected by magnet 30. That is, if a magnet is present between the primary-side coil and the secondary-side coil or at the periphery thereof while a magnetic flux is being generated between the primary-side coil and the secondary-side coil for power transmission, the magnetic flux extends so as to avoid the magnet. Alternatively, magnetic flux that penetrates the center of the magnet forms an eddy current or generates heat inside the magnet and is lost. In addition, when a magnet is disposed in the vicinity of a magnetic sheet, the magnetic permeability of a portion of the magnetic sheet, which is close to the magnet decreases. Accordingly, magnet 30 included in primary-side non-contact charging module 41 exerts an adverse effect by weakening the magnetic flux of, in particular, inside portions 211 and 212 of primary-side coil 21*a* and secondary-side coil 21*b*. As a result, transmission efficiency between the non-contact charging modules declines. Accordingly, in the case illustrated in FIG. 8A, the area of inside portions 211 and 212 that is liable to be adversely affected by magnet 30 increases. In contrast, in the case illustrated in FIG. 8C in which a magnet is not used, the L value increases since the number of turns of secondary-side coil 21*b* is large. Consequently, since there is a significant decrease in the numerical value from the L value in FIG. 8C to the L value in FIG. 8A, in the case of the coil that has a small inner width, there is a very large increase in the L-value decrease rate between the case where magnet 30 is included for alignment in the non-contact charging module on the counterpart side and the case where magnet 30 is not included. Further, when the inner width of secondary-side coil 21*b* is smaller than the diameter of magnet 30 as shown in FIG. 8A, secondary-side coil 21*b* directly receives an adverse effect of magnet 30 in an amount that corresponds to the area thereof facing magnet 30. Accordingly, the inner width of secondary-side coil 21*b* may preferably be larger than the diameter of magnet 30.

In contrast, when the inner width of the coil is large as shown in FIG. 8B, the area of inside portions 211 and 212 that is liable to be adversely affected by magnet 30 is extremely small. Further, in the case illustrated in FIG. 8D in which a magnet is not used, since the number of turns of secondary-side coil 21*b* deceases, the L value decreases compared to FIG. 8C. Consequently, the decrease in the numerical value from the L value in FIG. 8D to the L value in FIG. 8B is small, so that the L-value decrease rate can be limited to a small amount in a coil that has a large inner width. In addition, as the inner width of secondary-side coil 21*b* becomes larger, the amount by which the edge of the hollow portion of coil 21 is separated from magnet 30 increases, and hence the effects of magnet 30 can be reduced. However, since the non-contact charging module is mounted in a charger or an electronic apparatus or the like, the non-contact charging module cannot be formed to be larger than a certain size. Therefore, an attempt to increase the inner width of coils 21*a* and 21*b* in order to reduce the adverse effects from magnet 30 reduces the number of turns and the L value itself irrespective of the presence or absence of a magnet. The following description relates to a case where magnet 30 is circular. That is, when the outer diameter of magnet 30 and the inner width of coil 21 are approximately the same (outer diameter of magnet 30 is about 0 to 2 mm smaller than the inner width of coil 21), because magnet 30 can be enlarged to the maximum, the precision of aligning the primary-side non-contact charging module and the secondary-side non-contact charging module can be improved. Further, since the inner diameter of coil 21 can be minimized, the number of turns of coil 21 can be increased to improve the L value. Furthermore, when the outer diameter of magnet 30 is smaller than the inner diameter of coil 21 (outer diameter of magnet 30 is about 2 to 8 mm smaller than the inner width of coil 21), even if there are variations in the alignment precision, it is possible to ensure that magnet 30 is not present between portions at which inside portions 211 and 212 face each other. At this time, by setting the outer diameter of magnet 30 to a size that is equivalent to 70 to 95% of the size of the inner width of coil 21, it is possible to adequately cope with variations in the alignment precision, and the alignment precision between primary-side non-contact charging module 41 and secondary-side non-contact charging module 42 can be improved. Furthermore, the number of turns of coil 21 can also be secured. This means that, at a face parallel to plane coil section 2, the area of magnet 30 is equivalent to 70 to 95% of the area of a through-hole at the center of plane coil section 2. In primary-side non-contact charging module 41, primary-side coil 21a forms an LC resonance circuit through the use of a resonant capacitor. At this time, if the L value varies significantly between a case where a magnet is utilized for alignment and a case where a magnet is not utilized, a resonance frequency with the resonant capacitor will also vary significantly. Since the resonance frequency is used for power transmission between primary-side non-contact charging module 41 and secondary-side non-contact charging module 42, although it will not be possible to perform power transmission correctly if the resonance frequency varies significantly depending on the presence or absence of a magnet, the power transmission is made highly efficient by adopting the above-described configuration.

In addition, as shown in FIG. 9, when the size of magnet 30 and the outer diameter of coil 21 are made constant, the effects of magnet 30 on coil 21 decreases as the number of turns of coil 21 is decreased to increase the inner diameter of coil 21. That is, the L value of coil 21 of a case where magnet 30 is utilized to align the primary-side non-contact charging module and the secondary-side non-contact charging module, and the L value of coil 21 of a case where magnet 30 is not utilized for alignment become values close to each other. Accordingly, the value of the resonance frequency when using magnet 30 and the value of the resonance frequency when not using magnet 30 are extremely close to each other. Note that, in this case, the outer diameters of the coils are standardized at 30 mm.

In the WPC standard, the diameter of magnet 30 is defined as 15.5 mm and the strength thereof is around 100 mT. In the present embodiment, it is assumed that the inner diameter of coil 21 is 20 mm and the outer diameter is 30 mm. Further, the outer diameter of center portion 32 as a recessed shape or a through-hole is assumed to be 18 mm. That is, a distance between the inner diameter end of coil 21 of plane coil section 2 and the outer end of magnet 30 is approximately 4.5 mm. As shown in FIG. 9, by making the aforementioned distance equal to approximately 4.5 mm, the L values of coil 21 when using magnet 30 and when not using magnet 30 can be brought close to each other while maintaining the L values at a level equal to or higher than 15 μH. Further, by making the distance between the inner diameter end of coil 21 of plane coil section 2 and the outer end of magnet 30 greater than 0 mm but less than 6 mm, the L values when utilizing magnet 30 and when not utilizing magnet 30 can be brought close to each other while maintaining the L values at a level equal to or higher than 15 μH.

In the present embodiment, a Ni—Zn ferrite sheet, a Mn—Zn ferrite sheet, a Mg—Zn ferrite sheet or the like can be used as high-saturation magnetic flux density material 3a. The ferrite sheet (sintered body) can reduce the alternating-current resistance of coil 21 compared with an amorphous metal magnetic sheet. Preferably, high-saturation magnetic flux density material 3a is, in particular, a Mn—Zn ferrite sheet, and the magnetic permeability is equal to or higher than 250 and the saturation magnetic flux density is equal to or higher than 350 mT. In the present embodiment, the magnetic permeability is between 1500 and 2000, and the saturation magnetic flux density is approximately 400 mT. Using this kind of Mn—Zn ferrite sheet (sintered body) to form magnetic sheet 3 makes it difficult for magnetic sheet 3 to be adversely affected by a magnet and makes it possible to reduce the thickness of magnetic sheet 3. That is, the L value of coil 21 of non-contact charging module 1 varies significantly between a case where a magnet is used for alignment and a case where a magnet is not used for alignment. To reduce the effects of the magnet, magnetic sheet 3 includes a high-saturation magnetic flux density material (the saturation magnetic flux density is equal to or higher than 350 mT). The high-saturation magnetic flux density material is unlikely to be adversely affected by a magnet because it is difficult for the magnetic flux to saturate even when the magnetic field becomes strong. Thus, the L value of coil 21 of a case where a magnet is used can be improved. Accordingly, magnetic sheet 3 can be reduced in thickness. However, if the magnetic permeability of magnetic sheet 3 is too low, the L value of coil 21 decreases by an extremely large amount. Consequently, in some cases, the efficiency of non-contact charging module 1 is lowered. Therefore, it is preferable for the magnetic permeability to be at least 250, and more preferably to be 1500 or more.

A further reduction in thickness is enabled by using a Mn—Zn ferrite sheet. That is, the frequency of electromagnetic induction is defined by the standard (WPC) as a frequency between 100 kHz to 200 kHz (for example, 120 kHz). A Mn—Zn ferrite sheet is highly efficient in this low frequency band. Note that, a Ni—Zn ferrite sheet is highly efficient in a high frequency band.

To provide magnetic sheet 3 of the present embodiment with flexibility, slits are formed in magnetic sheet 3 in accordance with the technology described in Japanese Patent No. 4400509, to thereby form magnetic member pieces that are spread all over in a sheet shape. Therefore, the magnetic flux of coil 21 is liable to leak from the slits (gaps) between the magnetic member pieces, and thus the L value is liable to decrease and the transmission efficiency is liable to fall. However, by determining the saturation magnetic flux density and the magnetic permeability of magnetic sheet 3 in the manner described above, even in the case of magnetic sheet 3 in which slits are formed for flexibility, magnetic sheet 3 is unlikely to be adversely affected by a magnet used for alignment, and a reduction in the thickness thereof is possible. That is, it is possible to provide a magnetic sheet that can cope with the adverse effects caused by slits formed to provide flexibility. Further, it is possible to provide a non-contact charging module achieving a reduction in the thickness of the entire module with improved power transmission efficiency.

Figure 10:
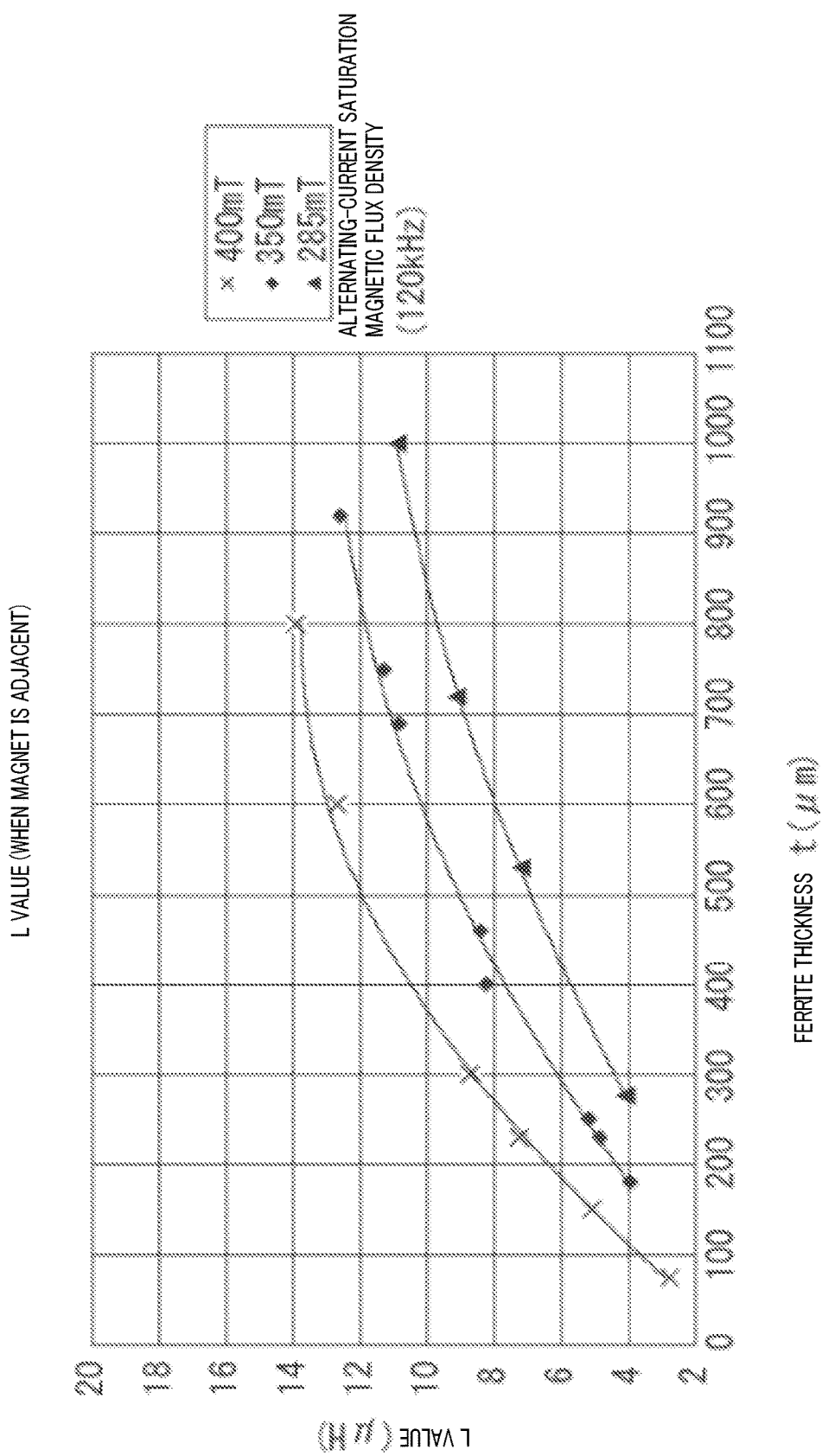
FIG. 10 illustrates the relationship between the thickness of the magnetic sheet and an L value of a plane coil section in the embodiment of the present invention.
Figure 11:
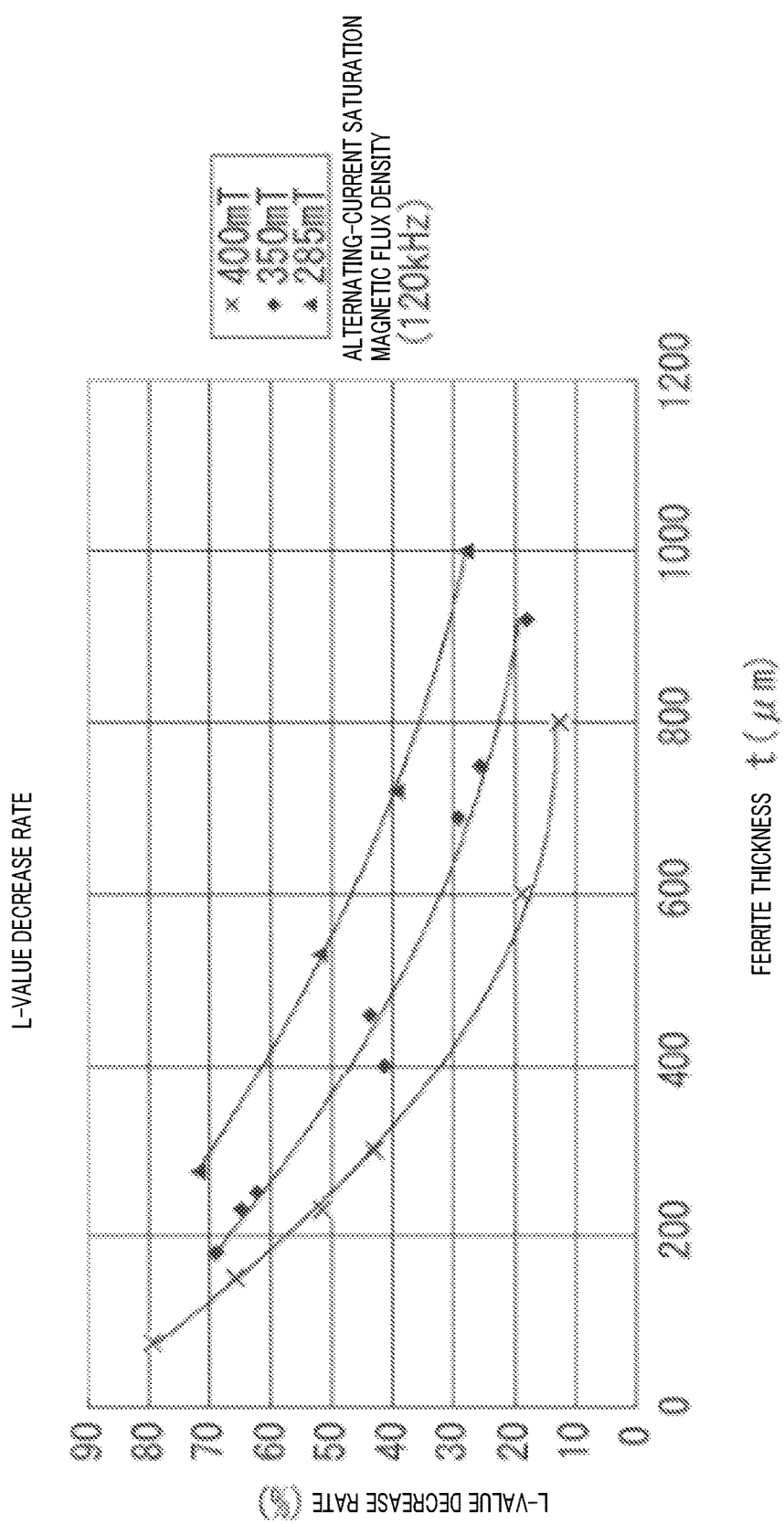
FIG. 11 illustrates the relationship between the thickness of the magnetic sheet and an L-value decrease rate when using a magnet for alignment and when not using a magnet for alignment in the embodiment of the present invention.

FIG. 10 illustrates the relationship between the thickness of the magnetic sheet and the L value of the plane coil section in the embodiment of the present invention (in a case where a magnet for alignment is used). FIG. 11 illustrates the relationship between the thickness of the magnetic sheet and the L-value decrease rate when using a magnet for alignment and when not using a magnet for alignment in the embodiment of the present invention. That is, the term "L-value decrease rate" refers to the rate of decrease in an L value that is measured when a coil is disposed close to a magnet under certain conditions relative to an L value that is measured when a magnet is not present close to the coil under the same conditions. Accordingly, the smaller the L-value decrease rate is, the less the L value of the coil is affected by the presence or absence of a magnet. Further, in FIG. 10 and FIG. 11, a coil that is wound in a circular shape is used. In addition, the main component of magnetic sheet 3 is a Mn—Zn ferrite sheet.

Further, a material having an alternating-current saturation magnetic flux density equal to 400 mT has a magnetic permeability of around 1800. A material having an alternating-current saturation magnetic flux density equal to 350 mT has a magnetic permeability of around 250. A material having an alternating-current saturation magnetic flux density equal to 285 mT has a magnetic permeability of around 2200.

As is apparent from FIG. 10 and FIG. 11, if the thickness of the magnetic sheet is 400 μm or more, the alternating-current saturation magnetic flux density is 350 mT or more, and the magnetic permeability is 250 or more, the L value of coil 21 will be equal to or higher than 8 μH, and the L-value decrease rate can also be reduced to a half or less even when a magnet for alignment is adjacent thereto. That is, when a magnet for alignment is adjacent to coil 21, the L value of coil 21 decreases, and charging by electromagnetic induction becomes difficult unless the L value is at least 8 μH at that time. As the L value increases, the power transmission efficiency between the transmission-side and reception-side non-contact charging modules improves. When the L-value decrease rate is equal to or higher than 50%, there is a twofold or more difference in the L values of coil 21 between a case where a magnet for alignment is used and a magnet for alignment is not used. The L value of coil 21 determines the frequency of transmission and reception in power transmission between a transmission-side non-contact charging module and a reception-side non-contact charging module, and the frequency will vary considerably if there is a twofold or more difference in the L values of coil 21. To ensure the non-contact charging module can efficiently perform power transmission in both of a case where a magnet for alignment is used and a case where a magnet for alignment is not used, it is necessary to limit the L-value decrease rate to a value equal to or less than 50% to set a frequency when using a magnet for alignment and a frequency when not using a magnet for alignment to be close to each other.

When the thickness of magnetic sheet 3 is made equal to or greater than 600 μm, the L value of coil 21 is equal to or higher than 10 μH. Further, when the saturation density is 350 mT and 400 mT, the L-value decrease rate is approximately 30% or less. Accordingly, it is preferable that the thickness of magnetic sheet 3 be equal to or greater than 600 μm as long as the value of thickness is acceptable with respect to the size of the non-contact charging module. In particular, when the thickness of a material having the alternating-current saturation magnetic flux density equal to 400 mT and the magnetic permeability equal to 1800 is made equal to or higher than 600 μm, the L value exceeds 12 μH and the L-value decrease rate is equal to or less than 20%. Thus, extremely efficient power transmission can be performed.

Next, the relationship between the thickness of magnetic sheet 3 and the L value of plane coil section 2 will be described with respect to a case where coil 21 is wound in a circular shape and a case where coil 21 is wound in a rectangular shape.

Figure 12:
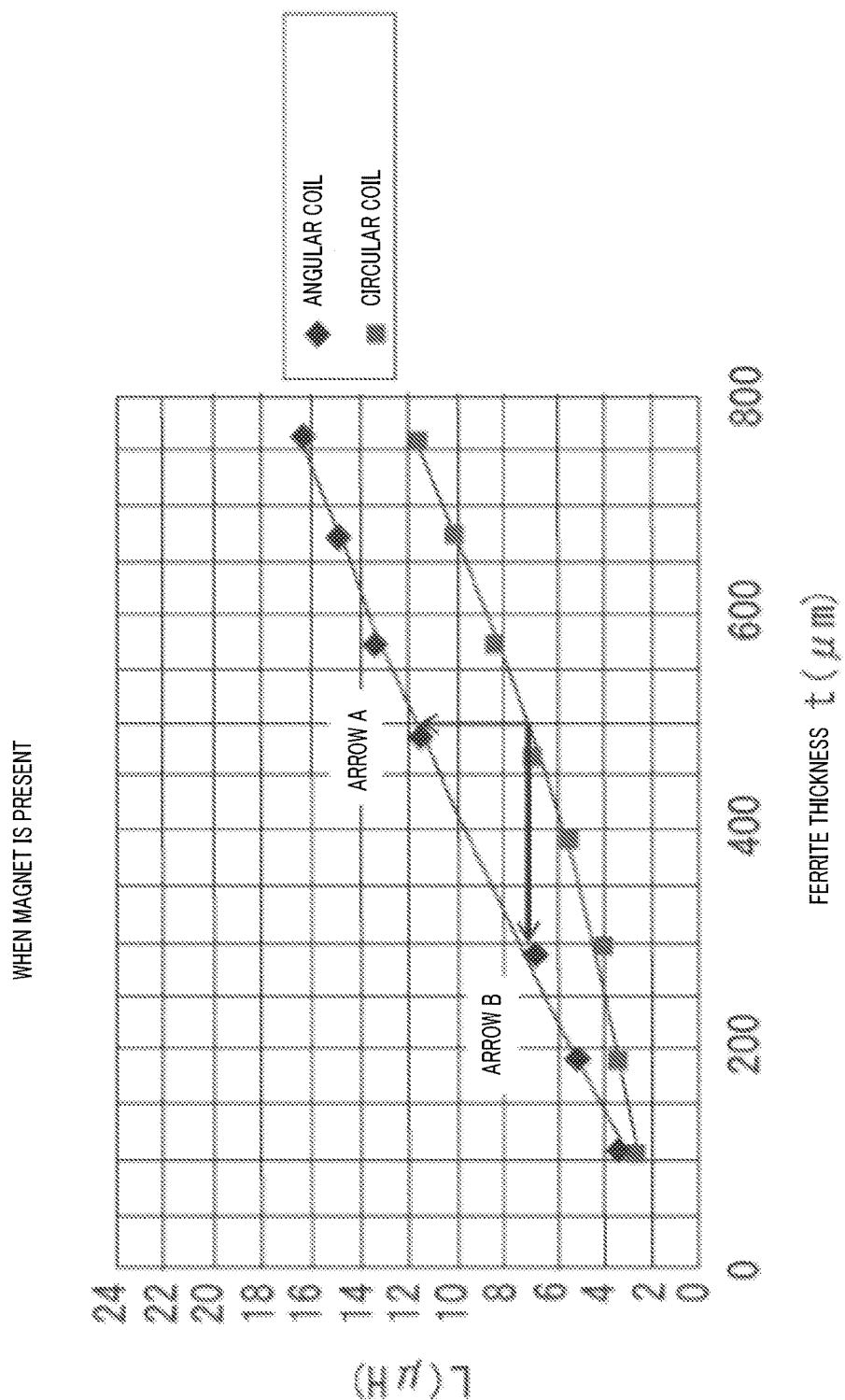
FIG. 12 illustrates the relationship between the thickness of the magnetic sheet and the L value of the plane coil section when the coil is of a circular shape and when the coil is of a rectangular shape in the embodiment of the present invention.
Figure 13:
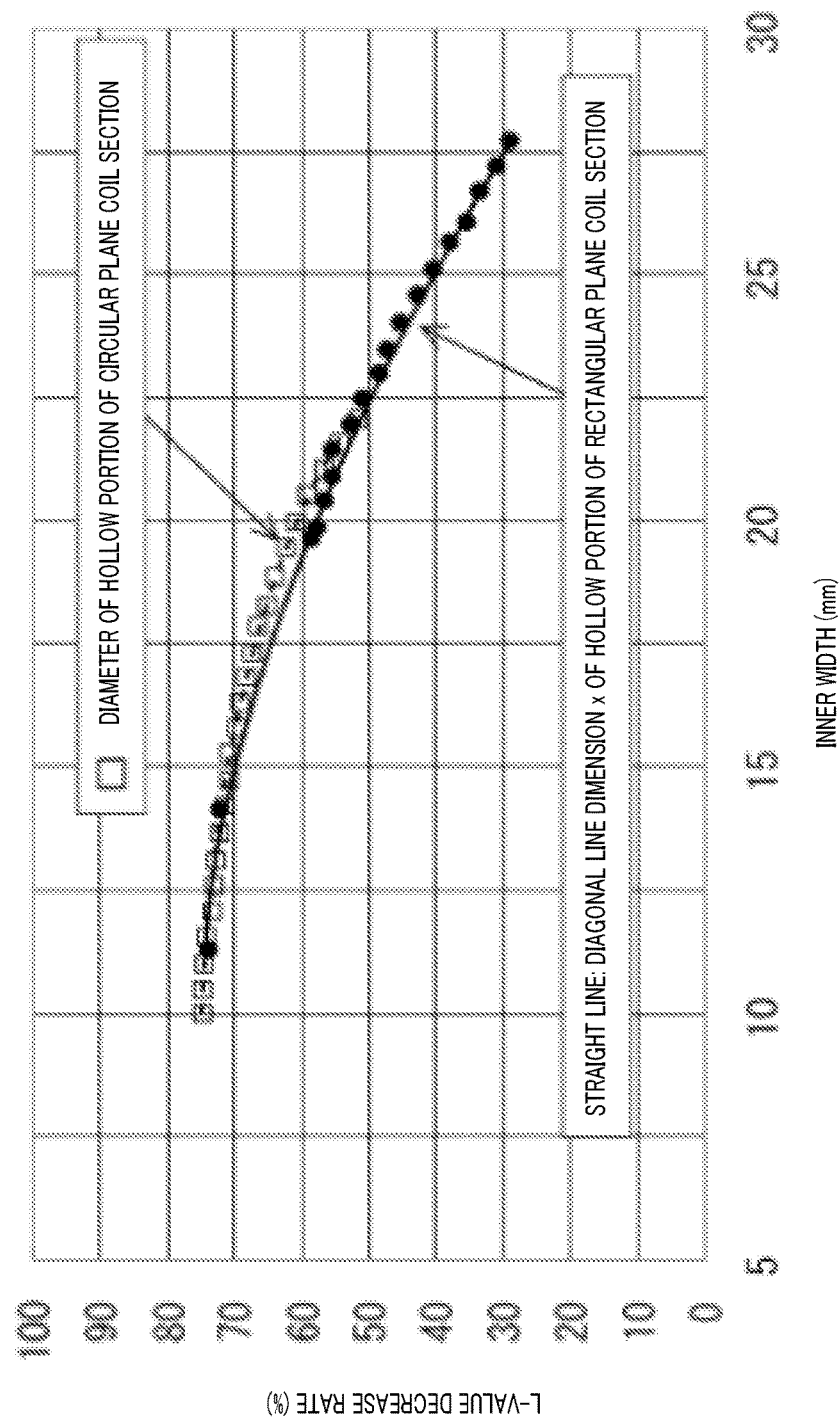
FIG. 13 illustrates the relationship between the inner diameter of the coil and the L-value decrease rate when the coil is of a circular shape and when the coil is of a rectangular shape in the embodiment of the present invention.
Figure 14B:
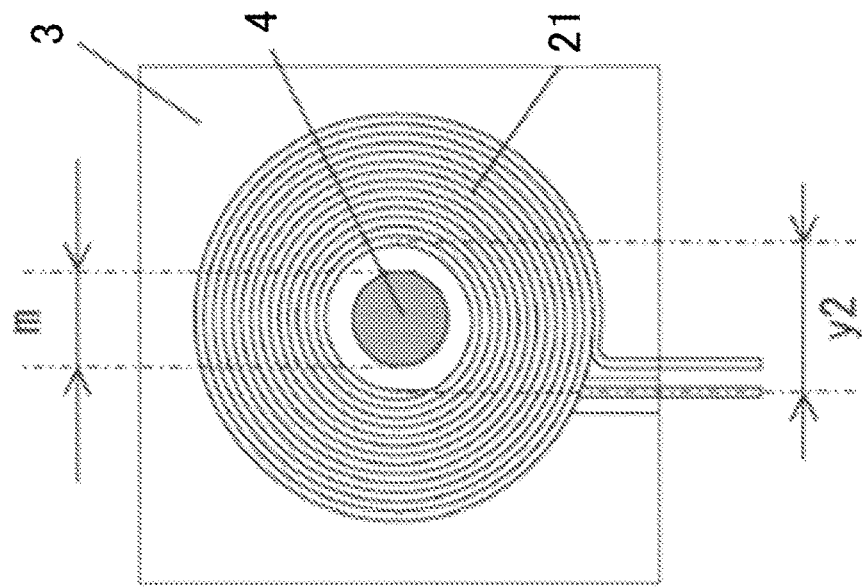
FIGS. 14A and 14B are top views of the non-contact charging module when the plane coil section is formed by winding a coil in a rectangular shape and when the plane coil section is formed by winding a coil in a circular shape in the embodiment of the present invention.
Figure 14A:
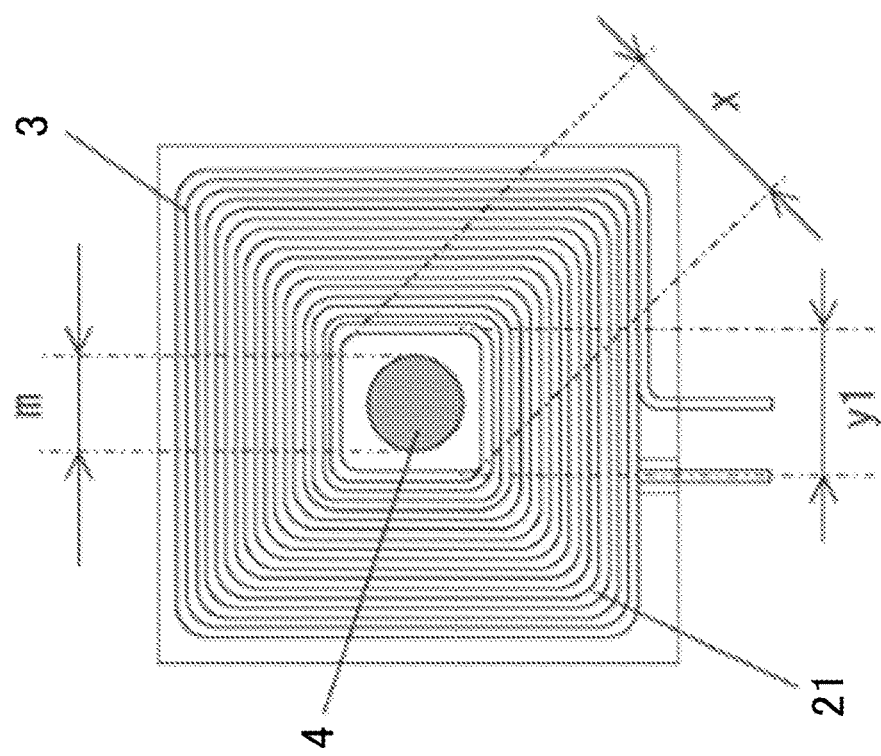

FIG. 12 illustrates the relationship between the thickness of the magnetic sheet and the L value of the plane coil section in a case where the coil is a circular shape and a case where the coil is a rectangular shape in the embodiment of the present invention (when a magnet for alignment is used). FIG. 13 illustrates the relationship between the inner diameter of the coil and the L-value decrease rate in a case where the coil is a circular shape and a case where the coil is a rectangular shape in the embodiment of the present invention. FIGS. 14A and 14B are top views of the non-contact charging module in a case where the plane coil section is wound in a rectangular shape and a case where the plane coil section is wound in a circular shape in the embodiment of the present invention. FIG. 14A illustrates the case where the plane coil section is wound in a rectangular shape, and FIG. 14B illustrates the case where the plane coil section is wound in a circular shape.

In FIG. 12, the term "L value" refers to an inductance value of plane coil section 2, and the larger the L value is, the higher the power transmission efficiency of the non-contact charging module is.

The L value of coil 21 needs to be approximately 8 μH in order to achieve the power transmission performance of the non-contact charging module. However, when an alignment magnet is present, the effect of increasing the magnetic field intensity of the magnetic sheet decreases due to the effects of the alignment magnet.

According to FIG. 12, when an alignment magnet is present, in order for the circular plane coil section to generate an L value of 6 to 8 μH, the ferrite thickness of magnetic sheet 3 needs to be 500 μm. Meanwhile, the L value of rectangular plane coil section 2 having the same ferrite thickness is 12 μH (arrow A).

Under the same conditions with respect to the ferrite thickness and area of magnetic sheet 3, the L value of the rectangular plane coil section is larger than the L value of the circular plane coil section. Accordingly, a magnetic field generated at the rectangular plane coil section is large and the power transmission efficiency of the non-contact charging module increases.

In an attempt to configure the rectangular plane coil section and the circular plane coil section to generate the same L value, the ferrite thickness of magnetic sheet 3 in the case of the rectangular plane coil section can be made thinner than the ferrite thickness of magnetic sheet 3 in the case of the circular plane coil section. That is, in order to obtain the target L value, the ferrite thickness of magnetic sheet 3 of the rectangular plane coil section can be set to 300 μm (see arrow B), and thus the ferrite thickness can be reduced. Accordingly, the thickness of non-contact charging module 1 can be reduced, which makes it easier to reduce the size of non-contact charging module 1.

Thus, the effects of a magnetic field of an alignment magnet can be avoided by forming a planar coil to be used in the non-contact charging module in a rectangular shape, and a reduction in the size of the non-contact charging module can be achieved by improving the power transmission efficiency of the non-contact charging module.

Note that, coil 21 is not limited to be wound in a rectangular shape, and in some cases, coil 21 is wound in a square shape having R at the corners or a polygonal shape. That is, it is sufficient that coil 21 is of a shape in which the entire coil is disposed on magnetic sheet 3 and which provides many inner edge portions of coil 21 that are apart from the outer edge of the alignment magnet. Among such optional shapes, a rectangular shape makes it possible to obtain the above-described effects, and it is also easy to form a rectangular coil.

As shown in FIG. 13, the larger the inner dimension of the coil is, the smaller the L-value decrease rate of plane coil section 2 will be. The reason behind this is that the effects of alignment magnet 30 decrease in this case because of the increase in the region that allows for extra space between alignment magnet 30 and the inner side of plane coil section 2. On the other hand, when diagonal line dimension x of the inner side of rectangular plane coil section 2 and inner diameter dimension y2 of circular plane coil section 2 are the same value as shown in FIGS. 14A and 14B, the L-value decrease rates of respective plane coil sections 2 are also the same.

That is, when diagonal line dimension x of the inner side of the rectangular plane coil section and inner diameter dimension y2 of circular plane coil section 2 are larger than diameter m of alignment magnet 30 (x, y2>m), a gap can be formed between the inner circumference of the plane coil section and the outer circumference of the alignment magnet. However, in this case, the planar area of the planar coil of the rectangular plane coil section is small compared to that of the circular plane coil section. Therefore, the diagonal dimension of the inner side of the rectangular plane coil section can be increased so as to correspond with the size of magnetic sheet 3. Accordingly, when plane coil section 2 is installed in magnetic sheet 3, the rectangular plane coil section allows a gap to be formed between the inner circumference of plane coil section 2 and the outer circumference of the alignment magnet and thus allows the effects of the alignment magnet to be reduced in comparison to a circular plane coil section.

Further, when dimension y1 of one side of the hollow portion of the rectangular plane coil section is made the same as inner diameter dimension y2 of circular plane coil section 2, diagonal line dimension x of the inner side of the rectangular plane coil section is greater than y1 and y2 (x>y1=y2). That is, when it is assumed that the number of turns of each plane coil section 2 is the same, the L value of the rectangular plane coil section is larger than the L value of the circular plane coil section although the sizes of non-contact charging modules 1 each including magnetic sheet 3 are identical. As a result, a non-contact charging module having favorable power transmission efficiency can be provided.

In short, in the above-described circular plane coil section, the distance from the magnet is constant at any part of the coil inner diameter, and a magnetic field generated at the circular plane coil section is small. That is, the L value of the circular plane coil section that affects the mutual inductance of electromagnetic induction is small, and the power transmission efficiency of the non-contact charging module is low. In contrast, in the above-described rectangular plane coil section, the distance between the inner circumference of the coil and the magnet varies depending on part of the inner circumference, and some part has a longer or shorter distance, and a magnetic field generated at the rectangular plane coil section increases at a portion that is apart from the magnet. That is, the L value of the rectangular plane coil section that affects mutual inductance of electromagnetic induction is larger than the L value of the circular plane coil section. Therefore, the power transmission efficiency of the non-contact charging module improves significantly compared to the circular plane coil section.

As described above, when coil 21 is an approximately rectangular shape, setting the thickness of magnetic sheet 3 equal to or higher than 400 μm makes it possible to obtain almost the same effect as that obtained when the thickness of magnetic sheet 3 is 600 μm with coil 21 of a circular shape. That is, very effective power transmission can be realized by winding coil 21 in a rectangular shape and configuring magnetic sheet 3 to have a magnetic permeability equal to or higher than 360, a saturation magnetic flux density equal to or higher than 1800 mT, and a thickness equal to or higher than 400 μm.

Note that, another magnetic material may also be stacked in magnetic sheet 3. For example, a configuration may be adopted in which two layers of high-saturation magnetic flux density material 3a are provided and high-magnetic permeability material 3b is interposed between high-saturation magnetic flux density materials 3a, or in which two layers of high-magnetic permeability material 3b are provided and high-saturation magnetic flux density material 3a is interposed between high-magnetic permeability materials 3b. That is, it is favorable if magnetic sheet 3 includes at least one layer of high-saturation magnetic flux density material 3a and at least one layer of high-magnetic permeability material 3b. As the thickness of magnetic sheet 3 increases, the power transmission efficiency improves as non-contact charging module 1.

Moreover, thick portions may be formed in regions of flat portion 31 where no coil 21 is disposed, the regions corresponding to the four corners of magnetic sheet 3. That is, nothing is placed on the regions corresponding to the four corners of magnetic sheet 3 and located on outer side of the outer circumference of coil 21 on flat portion 31. Accordingly, increasing the thickness of magnetic sheet 3 by forming thick portions in those regions can improve the power transmission efficiency of non-contact charging module 1. Although the thicker the thick portions are the better, the thickness of the thick portions is set to be almost equal to the thickness of the conducting wire for the purpose of a reduction in the thickness of the module.

Moreover, coil 21 is not limited to be wound in an annular shape and may be wound in a square shape or a polygonal shape. Furthermore, the effect of this application can also be obtained by performing winding in such a way that the inner side is wound in a plurality of stages one on top of another and the outer side is wound in the number of stages smaller than the number of stages for the inner side, for example, a three-stage structure for the inner side and a two-stage structure for the outer side.

Next, a non-contact charger including non-contact charging module 1 according to the present invention is explained. A non-contact transmitting apparatus includes a charger including a power transmission coil and a magnetic sheet and a main apparatus including a power reception coil and a magnetic sheet. The main apparatus is an electronic apparatus such as a cellular phone. A circuit on the charger side includes a rectifying and smoothing circuit section, a voltage conversion circuit section, an oscillation circuit section, a display circuit section, a control circuit section, and the power transmission coil. A circuit on the main apparatus side includes the power reception coil, a rectifying circuit section, a control circuit section, and a load L mainly formed of a secondary battery.

Power transmission from the charger to the main apparatus is performed using electromagnetic induction action between the power transmission coil of the charger, which is the primary side and the power reception coil of the main apparatus, which is the secondary side.

The non-contact charger in this embodiment includes non-contact charging module 1 explained above. Therefore, it is possible to reduce the size and the thickness of the non-contact charger in a state in which the sectional area of the plane coil section is sufficiently secured with improved power transmission efficiency.

The disclosures of the specifications, the drawings, and the abstracts included in Japanese Patent Application No. 2011-013619 filed on Jan. 26, 2011, Japanese Patent Application No. 2011-051217 filed on Mar. 9, 2011, and Japanese Patent Application No. 2011-135946 filed on Jun. 20, 2011 are incorporated herein by reference in their entirety.

INDUSTRIAL APPLICABILITY

According to the non-contact charging module of the present invention, it is possible to reduce the size and thickness of the non-contact charging module in a state in which the sectional area of the plane coil section is sufficiently secured with improved power transmission efficiency. Therefore, the non-contact charging module is useful, in particular, as a non-contact charging module for portable electronic apparatuses, and is useful as a non-contact charging module for various electronic apparatuses including portable terminals such as a cellular phone, a portable audio device, and a potable computer, and portable apparatuses such as a digital camera and a video camera.

REFERENCE SIGNS LIST

1 Non-contact charging module
2 Plane coil section
21 Coil
211, 212 Inside portion
21b Secondary-side coil (plane coil section)
22, 23 Terminals
3 Magnetic sheet
3a High-saturation magnetic flux density material (second layer)
3b High-magnetic permeability material (first layer)
30 Magnet
31 Flat portion
32 Center portion
33 Linear recessed portion
34 Slit
41 Primary-side non-contact charging module (transmission-side non-contact charging module)
42 Secondary-side non-contact charging module (reception-side non-contact charging module)

The invention claimed is:
1. A non-contact charging module comprising:
a wireless charging coil formed of an electrical wire wound to form a winding portion having a circular shape and two leg portions, wherein the electrical wire in the winding portion is wound in one layer, and the electrical wire is wound to define a hollow portion surrounded by the winding portion; and
a magnetic sheet overlapping the wireless charging coil and having a shape that does not coincide with the circular shape of the winding portion of the wireless charging coil;
wherein
a first height of the magnetic sheet in a thickness direction of the magnetic sheet is greater than a second height of the winding portion of the wireless charging coil;
the largest span of the hollow portion surrounded by the winding portion of the wireless charging coil is between 10 mm and 20 mm; and
the magnetic sheet includes a recess at a position corresponding to at least a portion of at least one of the leg portions.

2. The non-contact charging module according to claim 1, wherein the magnetic sheet includes a first layer and a second layer that has a lower magnetic permeability and a higher saturation magnetic flux density than the first layer, the first layer and the second layer being stacked in the magnetic sheet.

3. The non-contact charging module according to claim 2, wherein the first layer is formed of a first ferrite sheet and the second layer is formed of a second ferrite sheet.

4. The non-contact charging module according to claim 3, wherein a thickness of the second ferrite sheet is approximately three times a thickness of the first ferrite sheet in a stacking direction of the magnetic sheet.

5. The non-contact charging module according to claim 2, wherein the first layer includes an amorphous material.

6. The non-contact charging module according to claim 1, wherein the hollow portion has a circular shape and a diameter of the circular-shape hollow portion is between 10 mm and 20 mm.

7. The non-contact charging module according to claim 1, wherein the largest span of the hollow portion is greater than 15.5 mm.

8. The non-contact charging module according to claim 1, configured as a power transmission module.

9. The non-contact charging module according to claim 1, configured as a power reception module.

* * * * *